(12) United States Patent
Geisler et al.

(10) Patent No.: US 9,064,190 B2
(45) Date of Patent: Jun. 23, 2015

(54) ESTIMATING PIXEL VALUES IN DIGITAL IMAGE PROCESSING

(75) Inventors: Wilson S. Geisler, Austin, TX (US); Jeffrey S. Perry, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 63 days.

(21) Appl. No.: 13/816,189

(22) PCT Filed: Aug. 9, 2011

(86) PCT No.: PCT/US2011/047058
§ 371 (c)(1),
(2), (4) Date: Apr. 15, 2013

(87) PCT Pub. No.: WO2012/021502
PCT Pub. Date: Feb. 16, 2012

(65) Prior Publication Data
US 2013/0202199 A1    Aug. 8, 2013

Related U.S. Application Data

(60) Provisional application No. 61/371,849, filed on Aug. 9, 2010.

(51) Int. Cl.
*G06K 9/32* (2006.01)
*G06K 9/66* (2006.01)
*G06T 3/40* (2006.01)
*H04N 1/387* (2006.01)
*H04N 1/46* (2006.01)
*H04N 1/60* (2006.01)

(52) U.S. Cl.
CPC ............... *G06K 9/66* (2013.01); *G06T 3/4007* (2013.01); *H04N 1/387* (2013.01); *H04N 1/46* (2013.01); *H04N 1/60* (2013.01)

(58) Field of Classification Search
None
See application file for complete search history.

(56) References Cited

U.S. PATENT DOCUMENTS

| | | | |
|---|---|---|---|
| 2004/0136610 A1* | 7/2004 | Knox | 382/286 |
| 2006/0050990 A1 | 3/2006 | Yamanaka et al. | |
| 2008/0024683 A1* | 1/2008 | Damera-Venkata et al. | 348/744 |
| 2008/0267526 A1 | 10/2008 | Mitsunaga et al. | |
| 2010/0098305 A1 | 4/2010 | Burns et al. | |
| 2010/0103292 A1 | 4/2010 | Xiong et al. | |
| 2010/0177973 A1* | 7/2010 | Wedi et al. | 382/233 |
| 2014/0217179 A1* | 8/2014 | Wang | 235/462.13 |

OTHER PUBLICATIONS

International Search Report and Written Opinion in Application No. PCT/US2011/047058 mailed Feb. 17, 2012, 8 pages.

* cited by examiner

*Primary Examiner* — Randolph I Chu
(74) *Attorney, Agent, or Firm* — Meyertowns, Hood, Kivlin, Kowert & Goetzel, P.C.

(57) ABSTRACT

A method, system and computer program product for improving accuracy and computation efficiency in interpolation, upsampling and color channel estimation. A Bayesian estimator used to estimate the value of a pixel in an image is constructed using measurements of high-order (e.g., 3rd, 4th, 5th) statics for nearby points in natural images. These measurements reveal highly systematic statistical regularities that were ignored from the prior algorithms due to their restrictive measurements and assumptions. As a result, the accuracy in interpolation, upsampling and color channel prediction is improved. Furthermore, the process for constructing a Bayesian estimator is simpler and more direct by storing in a table the mean value of the pixel value to be estimated for each combination of values of nearby points in training samples. As a result of having a simpler and more direct approach than existing methods, the computational efficiency is improved.

22 Claims, 12 Drawing Sheets

|   |   |   | e |   |   |   |
|---|---|---|---|---|---|---|
|   |   |   |   |   |   |   |
|   |   |   | f |   |   |   |
| a |   | b | x | c |   | d |
| i-3 |   | i-1 | i g | i+1 |   | i+3 |
|   |   |   |   |   |   |   |
|   |   |   | h |   |   |   |

*FIG. 3*

ESTIMATING PIXEL VALUES IN DIGITAL IMAGE PROCESSING

This application claims the benefit of U.S. Provisional Application Ser. No. 61/371,849 filed on Aug. 9, 2010 and entitled "USING HIGHER ORDER STATISTICS TO ESTIMATE PIXEL VALUES IN DIGITAL IMAGE PROCESSING TO IMPROVE ACCURACY AND COMPUTATION EFFICIENCY, which is expressly incorporated by reference in its entirety for all purposes.

GOVERNMENT INTEREST

This invention was made with government support under Grant no. R01 EY011747 awarded by National Institutes of Health. The government has certain rights in the invention.

TECHNICAL FIELD

The present invention relates to digital image processing, and more particularly to using higher order statistics (e.g., second, third, fourth, fifth order or higher) in digital image processing (e.g., interpolation, upsampling) to improve accuracy and computation efficiency.

BACKGROUND

Digital image processing is the use of computer algorithms to perform image processing on digital images. Digital images may include an array of image pixel values. Image processing may involve image enlargement, deblurring of the digital image, removing noise and artifacts from the digital image, as well as encoding the pixel values during image compression. In image processing, point prediction or estimating pixel values in digital images may be used.

Currently, there are numerous processes for estimating pixel values in digital images. Some of these processes are based on image statistics and use first and second order statistics, or are based on estimates of the parameters of specific statistical models. Other processes are not based on statistics, but upon a deterministic model of images that may involve estimation of the model parameters. For example, some processes involve estimation of pixel values by fitting smooth functions and some other processes locate edges in an image and make estimates based on the location of these edges. All of these processes may use overly restrictive assumptions about the underlying structure of images, which may lead to a reduction in accuracy. Further, many of these processes are computationally intensive and processes that rely on fitting are limited in the size of the set of training signals that can be used to specify the estimator.

By using these methods that are restrictive in their measurements and assumptions about the underlying structure of the image, the process for estimating image pixel values given a digitized array of image pixel values may not be as accurate or efficient as possible. If, however, algorithms could be developed without these restrictive measurements and assumptions, and limitations on the size of the training set, then accuracy and computational efficiency for estimating pixel values may be improved.

Therefore, there is a need in the art for improving the accuracy and computational efficiency in estimating image pixel values in a digitized array of image pixel values by developing algorithms without these restrictions in measurements and assumptions. The present invention addresses these and other needs in the art.

SUMMARY

An example of a method of determining an optimum candidate pixel value in accordance with the disclosure includes: identifying a first plurality of candidate pixels in a training image wherein each of the plurality of candidate pixels is proximate to a first identical neighbor pixel group; for each of the first plurality of candidate pixels, determining a candidate pixel value thereby obtaining a first plurality of candidate pixel values; determining a plurality of statistical moments for the first plurality of candidate pixel values; and storing in memory a table including at least one of: (1) a first optimum candidate pixel value corresponding to the first identical neighbor pixel group, the first optimum candidate pixel being determined based on the plurality of statistical moments, and (2) information indicative of the plurality of statistical moments.

An example of a computer program product embodied in a computer readable storage medium for determining an optimum pixel value in accordance with the disclosure includes programming instructions for: identifying a first plurality of candidate pixels in a training image wherein each of the plurality of candidate pixels is proximate to a first identical neighbor pixel group; for each of the first plurality of candidate pixels, determining a candidate pixel value thereby obtaining a first plurality of candidate pixel values; determining a plurality of statistical moments for the first plurality of candidate pixel values; and storing in memory a table including at least one of: (1) a first optimum candidate pixel value corresponding to the first identical neighbor pixel group, the first optimum candidate pixel being determined based on the plurality of statistical moments, and (2) information indicative of the plurality of statistical moments.

An example of a system for determining an optimum pixel value in accordance with the disclosure includes a memory unit; and a processor coupled to the memory unit. The processor is configured to: identify a first plurality of candidate pixels in a training image wherein each of the plurality of candidate pixels is proximate to a first identical neighbor pixel group; for each of the first plurality of candidate pixels, determine a candidate pixel value thereby obtaining a first plurality of candidate pixel values; determine a plurality of statistical moments for the first plurality of candidate pixel values; and store in the memory unit a table including at least one of: (1) a first optimum candidate pixel value corresponding to the first identical neighbor pixel group, the first optimum candidate pixel being determined based on the plurality of statistical moments, and (2) information indicative of the plurality of statistical moments.

An example of a method of estimating a missing pixel value in accordance with the disclosure includes: identifying a missing pixel in an image, wherein the missing pixel is proximate to a first neighbor pixel group in the image; and identifying, in a table of optimum pixel values stored in memory, an optimum pixel value for the missing pixel, the optimum pixel value being stored in the table in reference to the first neighbor pixel group, the optimum pixel value being previously determined based on a plurality of statistical moments for a first plurality of candidate pixel values located proximate to the first neighbor pixel group in at least one training image.

An example of a computer program product embodied in a computer readable storage medium for estimating a missing pixel value in accordance with the disclosure includes programming instructions for: identifying a missing pixel in an image, wherein the missing pixel is proximate to a first neighbor pixel group in the image; and identifying, in a table of optimum pixel values stored in memory, an optimum pixel value for the missing pixel, the optimum pixel value being stored in the table in reference to the first neighbor pixel group, the optimum pixel value being previously determined based on a plurality of statistical moments for a first plurality of candidate pixel values located proximate to the first neighbor pixel group in at least one training image.

An example of a system for determining a missing pixel value in accordance with the disclosure includes: a memory unit; and a processor coupled to the memory unit, wherein the processor is configured to: identify a missing pixel in an image, wherein the missing pixel is proximate to a first neighbor pixel group in the image; and identify, in a table of optimum pixel values stored in the memory unit, an optimum pixel value for the missing pixel, the optimum pixel value being stored in the table in reference to the first neighbor pixel group, the optimum pixel value being previously determined based on a plurality of statistical moments for a first plurality of candidate pixel values located proximate to the first neighbor pixel group in at least one training image.

An example of a method of determining an optimum high resolution candidate pixel value in accordance with the disclosure includes: identifying a plurality of candidate pixels in a high resolution training image wherein each of the plurality of candidate pixels is located in a respective portion of the high resolution training image that corresponds to a plurality of respective portions of a low resolution training image, each of the plurality of portions of the low resolution training image comprising a first identical neighbor pixel group; for each of the plurality of candidate pixels, determining a candidate pixel value from the high resolution image thereby obtaining a plurality of candidate pixel values; determining a plurality of statistical moments for the plurality of candidate pixel values; and storing in memory a table including at least one of: (1) a first optimum candidate pixel value corresponding to the first identical neighbor pixel group, the first optimum candidate pixel being determined based on the plurality of statistical moments, and (2) information indicative of the plurality of statistical moments.

An example of a computer program product embodied in a computer readable storage medium for determining an optimum high resolution candidate pixel value in accordance with the disclosure includes programming instructions for: identifying a plurality of candidate pixels in a high resolution training image wherein each of the plurality of candidate pixels is located in a respective portion of the high resolution training image that corresponds to a plurality of respective portions of a low resolution training image, each of the plurality of portions of the low resolution training image comprising a first identical neighbor pixel group; for each of the plurality of candidate pixels, determining a candidate pixel value from the high resolution image thereby obtaining a plurality of candidate pixel values; determining a plurality of statistical moments for the plurality of candidate pixel values; and storing in memory a table including at least one of: (1) a first optimum candidate pixel value corresponding to the first identical neighbor pixel group, the first optimum candidate pixel being determined based on the plurality of statistical moments, and (2) information indicative of the plurality of statistical moments.

An example of a system for determining an optimum high resolution candidate pixel value in accordance with the disclosure includes a memory unit, and a processor coupled to the memory unit. The processor is configured to: identify a plurality of candidate pixels in a high resolution training image wherein each of the plurality of candidate pixels is located in a respective portion of the high resolution training image that corresponds to a plurality of respective portions of a low resolution training image, each of the plurality of portions of the low resolution training image comprising a first identical neighbor pixel group; for each of the plurality of candidate pixels, determine a candidate pixel value from the high resolution image thereby obtaining a plurality of candidate pixel values; determine a plurality of statistical moments for the plurality of candidate pixel values; and store in the memory unit a table including at least one of: (1) a first optimum candidate pixel value corresponding to the first identical neighbor pixel group, the first optimum candidate pixel being determined based on the plurality of statistical moments, and (2) information indicative of the plurality of statistical moments.

An example of a method of upsampling an image in accordance with the disclosure includes: identifying a missing pixel in a desired up-sampled image; identifying a first portion of a low resolution image, the low resolution image being a lower resolution version of the desired up-sampled image, the first portion of the low resolution version comprising a first neighbor pixel group, the first pixel being located in a respective portion of the desired up-sampled image corresponding to the first portion of the low resolution image; and identifying, in a table of optimum pixel values stored in memory, an optimum up-sampled pixel value for the missing pixel, the optimum pixel value being stored in the table in reference to the first neighbor pixel group, the optimum pixel value being previously determined based on a plurality of statistical moments for a first plurality of candidate pixel values located proximate to the first neighbor pixel group in at least one training image.

An example of a computer program product embodied in a computer readable storage medium for upsampling an image in accordance with the disclosure includes programming instructions for: identifying a missing pixel in a desired up-sampled image; identifying a first portion of a low resolution image, the low resolution image being a lower resolution version of the desired up-sampled image, the first portion of the low resolution version comprising a first neighbor pixel group, the first pixel being located in a respective portion of the desired up-sampled image corresponding to the first portion of the low resolution image; and identifying, in a table of optimum pixel values stored in memory, an optimum up-sampled pixel value for the missing pixel, the optimum pixel value being stored in the table in reference to the first neighbor pixel group, the optimum pixel value being previously determined based on a plurality of statistical moments for a first plurality of candidate pixel values located proximate to the first neighbor pixel group in at least one training image.

An example of a system for upsampling an image in accordance with the disclosure includes a memory unit and a processor coupled to the memory unit. The processor is configured to: identify a missing pixel in a desired up-sampled image; identify a first portion of a low resolution image, the low resolution image being a lower resolution version of the desired up-sampled image, the first portion of the low resolution version comprising a first neighbor pixel group, the first pixel being located in a respective portion of the desired up-sampled image corresponding to the first portion of the low resolution image; and identify, in a table of optimum pixel values stored in the memory unit, an optimum up-sampled pixel value for the missing pixel, the optimum pixel value being stored in the table in reference to the first neighbor pixel group, the optimum pixel value being previously determined based on a plurality of statistical moments for a first plurality of candidate pixel values located proximate to the first neighbor pixel group in at least one training image.

An example of a method of determining an optimum color pixel value for a missing color channel in accordance with the disclosure includes: identifying a plurality of candidate pixels in a training image wherein each of the plurality of candidate pixels comprises an identical first color channel pixel value and an identical second color channel pixel value, wherein the training image comprises a plurality of pixels, each of the pixels comprising a first color channel pixel value, a second color channel pixel value and a third color channel pixel value; for each of the plurality of candidate pixels, determining a third color channel candidate pixel value, thereby obtaining a plurality of third color channel candidate pixel values; determining a plurality of statistical moments for the plurality of third color channel candidate pixel values; and storing in memory a table including at least one of: (1) an optimum third color channel pixel value corresponding to the identical first color channel pixel value and the identical second color channel pixel value, the optimum third color channel pixel value being determined based on the plurality of statistical moments, and (2) information indicative of the plurality of statistical moments.

An example of a computer program product embodied in a computer readable storage medium for determining an optimum color pixel value for a missing color channel in accordance with the disclosure includes programming instructions for: identifying a plurality of candidate pixels in a training image wherein each of the plurality of candidate pixels comprises an identical first color channel pixel value and an identical second color channel pixel value, wherein the training image comprises a plurality of pixels, each of the pixels comprising a first color channel pixel value, a second color channel pixel value and a third color channel pixel value; for each of the plurality of candidate pixels, determining a third color channel candidate pixel value, thereby obtaining a plurality of third color channel candidate pixel values; determining a plurality of statistical moments for the plurality of third color channel candidate pixel values; and storing in memory a table including at least one of: (1) an optimum third color channel pixel value corresponding to the identical first color channel pixel value and the identical second color channel pixel value, the optimum third color channel pixel value being determined based on the plurality of statistical moments, and (2) information indicative of the plurality of statistical moments.

An example of a system for determining an optimum color pixel value for a missing color channel in accordance with the disclosure includes a memory unit, and a processor coupled to the memory unit. The processor is configured to: identify a plurality of candidate pixels in a training image wherein each of the plurality of candidate pixels comprises an identical first color channel pixel value and an identical second color channel pixel value, wherein the training image comprises a plurality of pixels, each of the pixels comprising a first color channel pixel value, a second color channel pixel value and a third color channel pixel value; for each of the plurality of candidate pixels, determine a third color channel candidate pixel value, thereby obtaining a plurality of third color channel candidate pixel values; determine a plurality of statistical moments for the plurality of third color channel candidate pixel values; and store in the memory unit a table including at least one of: (1) an optimum third color channel pixel value corresponding to the identical first color channel pixel value and the identical second color channel pixel value, the optimum third color channel pixel value being determined based on the plurality of statistical moments, and (2) information indicative of the plurality of statistical moments.

An example of a method of determining a color pixel value for a missing color channel in accordance with the disclosure includes: identifying a first pixel in an image, the first pixel comprising a first color channel value and a second color channel value; and identifying, in a table of optimum third color channel pixel values stored in memory, an optimum third color channel pixel value for the first pixel, the third color being a different color than the first color or the second color, the optimum third color channel pixel value being stored in the table in association with the first color channel value and the second color channel value of the first pixel, the optimum pixel value being previously determined based on a plurality of statistical moments for a first plurality of candidate third color channel pixel values of at least one training image, each of the candidate third color channel pixel values being located at pixels comprising the first color channel value and the second color channel value of the first pixel.

An example of a computer program product embodied in a computer readable storage medium for determining a color pixel value for a missing color channel in accordance with the disclosure includes programming instructions for: identifying a first pixel in an image, the first pixel comprising a first color channel value and a second color channel value; and identifying, in a table of optimum third color channel pixel values stored in memory, an optimum third color channel pixel value for the first pixel, the third color being a different color than the first color or the second color, the optimum third color channel pixel value being stored in the table in association with the first color channel value and the second color channel value of the first pixel, the optimum pixel value being previously determined based on a plurality of statistical moments for a first plurality of candidate third color channel pixel values of at least one training image, each of the candidate third color channel pixel values being located at pixels comprising the first color channel value and the second color channel value of the first pixel.

An example of a system for determining a color pixel value for a missing color channel in accordance with the disclosure includes a memory unit, and a processor coupled to the memory unit. The processor is configured to: identify a first pixel in an image, the first pixel comprising a first color channel value and a second color channel value; and identify, in a table of optimum third color channel pixel values stored in the memory unit, an optimum third color channel pixel value for the first pixel, the third color being a different color than the first color or the second color, the optimum third color channel pixel value being stored in the table in association with the first color channel value and the second color channel value of the first pixel, the optimum pixel value being previously determined based on a plurality of statistical moments for a first plurality of candidate third color channel pixel values of at least one training image, each of the candidate third color channel pixel values being located at pixels comprising the first color channel value and the second color channel value of the first pixel.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3 illustrates a training image containing a digital array of pixel values;

Figure 1:
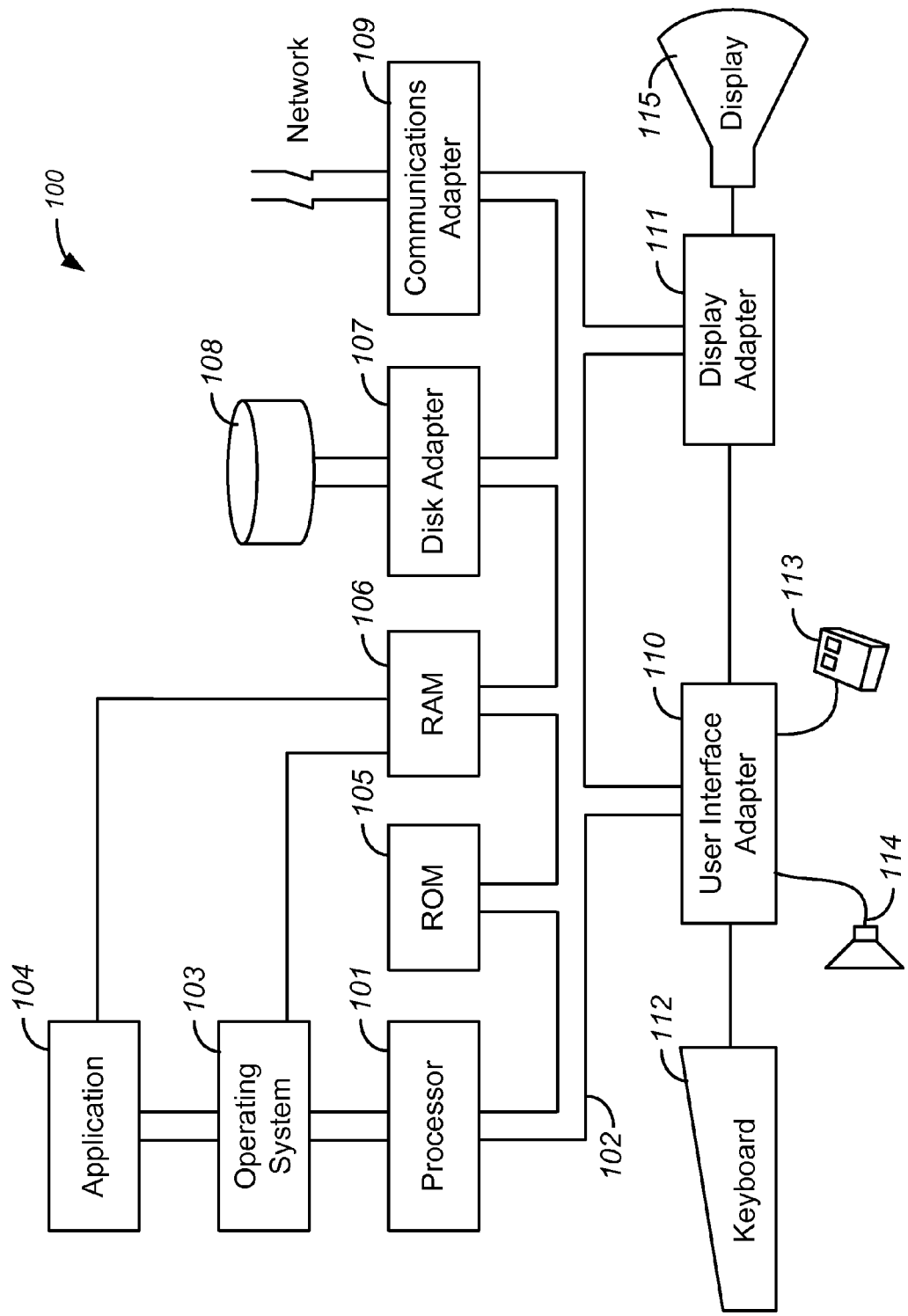
FIG. 1 is a configuration of a computer system configured in accordance with an embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

While the following discusses systems and methods in connection with using high-order (e.g., second, third, fourth and higher) statistics to estimate pixel values in digital images, the principles disclosed herein may be applied to other types of signals, such as sound, radar, etc. A person of ordinary skill in the art would be capable of applying the principles disclosed herein to such implementations. Further, embodiments applying the principles of the present invention to such implementations would fall within the scope of the disclosure.

Furthermore, while the following discusses the disclosed systems and methods in connection with computing a Bayesian estimator using a 1st moment, other types of Bayesian estimators could be computed using higher order moments. For example, a statistical moment ($k^{th}$ moment) in the case of three conditional variables (a, b and c) is represented in the following equation:

$$E(x^k \mid a, b, c) = \sum_x x^k p(x \mid a, b, c) \qquad (1)$$

The statistical expected values described herein are examples of the statistical first moment which can be used in conjunction with the variance, an example of the second statistical moment, to provide the Bayesian optimal minimum-mean-square-error (MMSE) estimate. The principles disclosed herein may be applied to computing higher order (e.g., third, fourth and higher) statistical moments to obtain other types of optimal estimators. The third statistical moment is commonly referred to as skewness and is a measure of the symmetry of a distribution. The fourth statistical moment is commonly referred to as kurtosis and is a measure of the flatness or peakedness of a distribution. A person of ordinary skill in the art would be capable of applying the principles of the disclosure to such implementations.

In the following description, numerous specific details are set forth to provide a thorough understanding of the disclosed systems and methods. However, it will be apparent to those skilled in the art that the disclosed methods may be practiced without such specific details. In other instances, well-known circuits have been shown in block diagram form in order not to obscure the disclosed systems in unnecessary detail. For the most part, details considering timing considerations and the like have been omitted inasmuch as such details are not necessary to obtain a complete understanding of the present invention and are within the skills of persons of ordinary skill in the relevant art. The following relationships can be used to calculate the first four statistical moments:

$$\text{Mean}(X) = \mu = \frac{1}{N}\sum x \qquad (2A)$$

$$\text{Var}(X) = \frac{1}{N}\sum x^2 - \mu^2 \qquad (2B)$$

$$\text{Std\_Deviation}(X) = \sigma = \sqrt{\text{Var}(x)} \qquad (2C)$$

$$\text{Skewness}(X) = \frac{\left(\frac{1}{2}\sum x^3 - 3\mu\sigma^2 + 2\mu^3\right)}{\sigma^3} \qquad (2D)$$

$$\text{Kurtosis}(X) = \frac{\left(\frac{1}{N}\sum x^4 - 4\mu\frac{1}{N}\sum x^3 + 6\mu^2\frac{1}{N}\sum x^2 - 3\mu^4\right)}{\sigma^4} - 3 \qquad (2E)$$

Alternative expressions for the first four statistical moments including terms of expected values include:

$$\text{Mean}(X) = E(X) \qquad (2F)$$

$$\text{Var}(X) = E(X^2) - E(X)^2 \qquad (2G)$$

$$\text{Skewness}(X) = \frac{(E(X^3) - 3E(X)(E(X^2) - E(X)^2) + 2E(X)^3)}{(E(X^2) - E(X)^2)^{\frac{3}{2}}} \qquad (2H)$$

$$\text{Kurtosis}(X) = \frac{(E(X^4) - 4E(X)E(X^3) + 6E(X^2)E(X)^2 - 3E(X)^4)}{(E(X^2) - E(X)^2)^2} - 3 \qquad (2I)$$

FIG. 1 illustrates an embodiment of a hardware configuration of a computer system 100 which is representative of a hardware environment for practicing methods of the disclosure. Referring to FIG. 1, computer system 100 has a processor 101 coupled to various other components by system bus 102. An operating system 103 runs on processor 101 and provides control and coordinates the functions of the various components of FIG. 1. An application 104 in accordance with the principles of the disclosure runs in conjunction with operating system 103 and provides calls to operating system 103 where the calls implement the various functions or services to be performed by application 104. Application 104 may include, for example, an application for predicting a value of a missing pixel as discussed further below in association with FIGS. 2-3. Furthermore, application 104 may include an application for upsampling from a low resolution image to a high resolution image as discussed further below in association with FIGS. 4, 5 and 6. Still further, application 104 may include an application for predicting a missing or additional color channel pixel values as discussed below in association with FIG. 7.

Referring again to FIG. 1, read-only memory ("ROM") 105 is coupled to system bus 102 and may include a basic input/output system ("BIOS") that controls certain basic functions of computer device 100. Random access memory ("RAM") 106 and disk adapter 107 is also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the programs for predicting missing pixel values, upsampling and predicting missing/additional color channel pixel values, as discussed further below in association with FIGS. 2-7, may reside in disk unit 108 or in application 104.

Computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects described herein may be embodied as a system, method or computer program product. Accordingly, aspects described herein may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of methods and systems in accordance with the disclosure are described below with reference to flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, there are numerous processes for estimating pixel values in digital images. However, these methods are restrictive in their measurements and assumptions about the underlying structure of the image, and in the practical size of the training sets used to specify the estimator. By using these methods that are restrictive in their measurements and assumptions about the underlying structure of the image and the size of training sets, the process for estimating image pixel values given a digitized array of image pixel values may not be as accurate or efficient as possible. If, however, algorithms could be developed without these restrictive measurements and assumptions, then accuracy and computational efficiency for estimating pixel values may be improved. Therefore, there is a need in the art for improving the accuracy and computational efficiency in estimating image pixel values in a digitized array of image pixel values by developing algorithms without these restrictions in measurements and assumptions.

The principles described herein provide a technique for improving the accuracy and computation efficiency by using high-order statistics (e.g., second, third, fourth and fifth order) for measurements of nearby points in natural images as discussed below. As a result of using higher order statistics, additional insight is gained into the structure of the natural image. That is, the use of higher order statistics can be exploited to achieve substantially more accurate missing pixel prediction, upsampling and missing/additional color channel pixel prediction than is possible with standard methods.

The methods described herein utilize training images to develop statistical moment tables. A well know database of images is the Van Hateren Natural Image Database. The Van Hateren images are a set of more than 4000 calibrated natural images that are often used in vision science research. Testing has shown that images of higher quality than the Van Hateren images can produce better results. Better results were obtained by collecting images using a higher quality, higher resolution camera than the camera used to collect the Van Hateren images. In addition, the Van Hateren images are only available in grayscale whereas the images captured using the high quality camera are color.

Figure 2A:
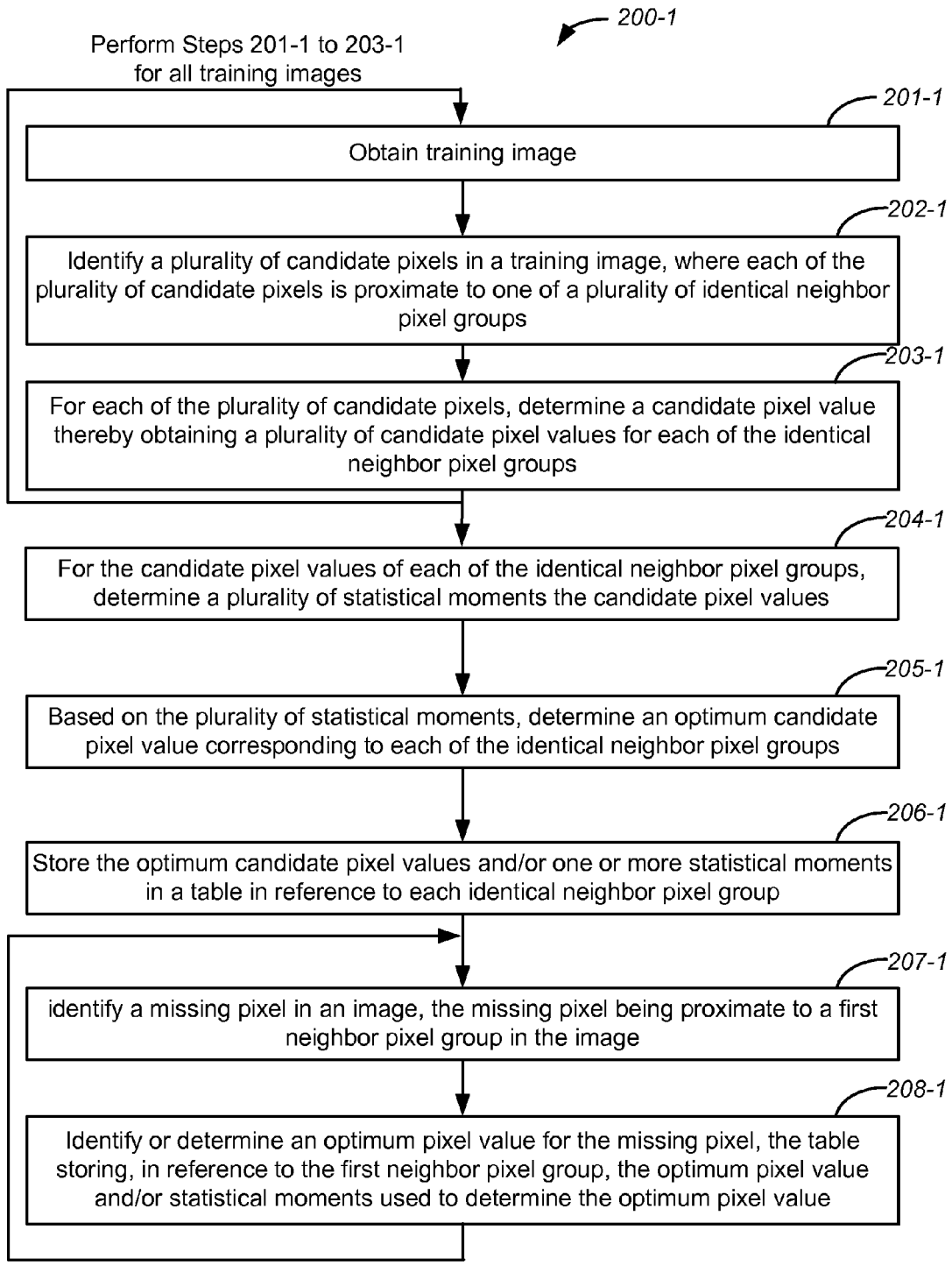
FIG. 2A is a flowchart of a method of missing pixel interpolation in accordance with the disclosure.

FIG. 2A is a flowchart of a method 200-1 of performing missing pixel interpolation in accordance with the disclosure. Interpolation refers to the process of estimating a missing image point in a digital image. The method 200-1 includes two main portions, a training portion including steps 200-1 to 200-6, and a restoration portion including steps 200-7 and 200-8. The training portion uses a set of training images to derive a statistical moment table that is then used in the restoration portion to interpolate missing pixels in an image.

The training images and the images to be restored using the method 200-1 (and methods 200-2, 400-1, 400-2 and 410 described below) can include various color spaces including RGB, RYGB, CIE Lab, LMS, etc. Testing has shown that the training images can be in a different color space than the image to be restored. In particular, training images that comprise a single channel, e.g., a grey scale, luminance or luma channel, can be used to derive the statistical moments table and this table can then be applied independently to three (or four) color channels such as RGB, LMS, RYGB, etc., with little or moderate variation in performance. It has been found that for images of natural scenery, the RGB channels, or other color space channels, all have similar structure (statistical moment wise) to a single grey, luminance or luma channel. As an alternative to using a single grey scale, luma or luminance channel, the training portion could consider multiple color channels independently and derive a statistical moment table for each color channel and then apply those independent tables to each respective color channel in the restoration portion.

Referring to FIG. 2, in conjunction with FIG. 1, in step 201-1, a training image is obtained. The training image is one of a plurality of training images in a set of training images. The training image and/or the training image set can be arbitrarily large, such as on the order of millions of pixels per image and hundreds or thousands of images. The computational requirements of methods (methods 200, 400 and 700) described below scale linearly with the number of pixels in the arbitrarily large training sets. This makes it possible to accurately estimate large statistical moment tables using the arbitrarily large training sets as described further below. A training sample refers to a digital array of pixel values extracted from a portion of an array of pixel values on a digital image as illustrated in FIG. 3.

Figure 3:
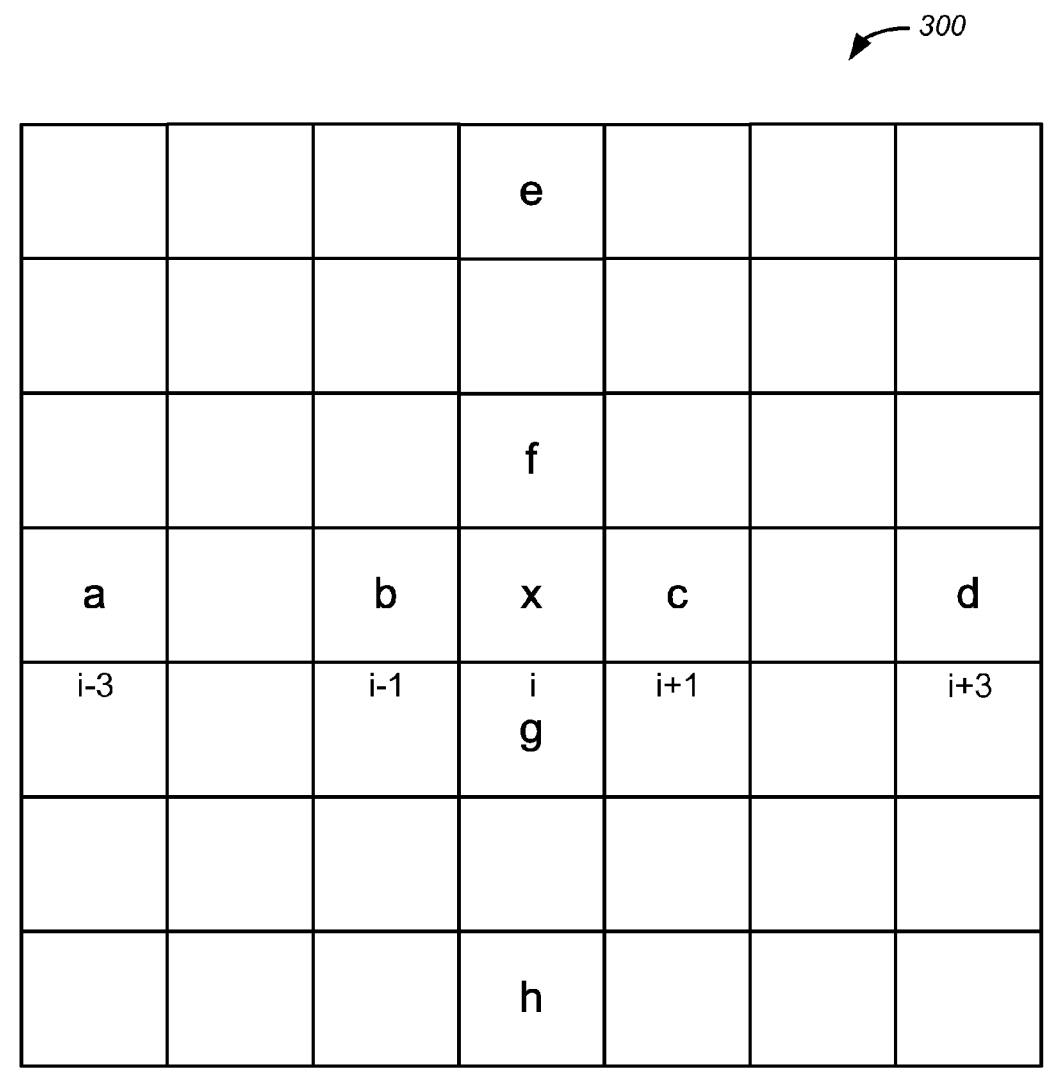

FIG. 3 illustrates a single training sample 300 of the digital image obtained at step 201-1. The training sample 300 contains a digital array of pixel values in two dimensions. Referring to FIG. 3, training sample 300 includes pixel values identified by "a," "b," "x," "c," and "d" at various pixel positions in a row identified by "i+3," "i+1," "i," "i−1" and "i−3," respectively. As stated above, interpolation involves the process of estimating a missing image point. In the example of FIG. 3, the pixel value identified by "x" is the pixel to be interpolated. As a result, a function, such as a Bayes or Bayesian estimator, is constructed for identical neighbor pixel groups (e.g., a group b and c, or a group a, b, c and d) based on statistics of the pixel values of a plurality of "x" pixels that are located within the identical neighbor pixel group. For instance, the Bayesian estimator may be constructed to estimate the pixel value identified by "x" using neighboring pixel values, such as the two nearest pixel values (e.g., pixel values "b" and "c"), or the four nearest pixel values (e.g., pixel values "a," "b," "c" and "d"). As will be discussed further below, the Bayesian estimator may be constructed using 3rd-order statistics (e.g., using two nearest pixel values), 4th-order statistics (e.g., using three nearest pixel values) or 5th-order statistics (e.g., using four nearest pixel values). It is noted that while the following discusses the pixel value identified by "x" as being interpolated, any pixel value may be interpolated.

Furthermore, training sample 300 includes other pixel values that are located above and below the pixel value identified by "x." In such an embodiment, the Bayesian estimator (or another independent Bayesian estimator) may also be constructed to estimate the pixel value identified by "x" using neighboring pixel values that are located above and below the pixel value identified by "x", such as the two nearest pixel values (e.g., pixel values "f" and "g"), or the four nearest pixel values (e.g., pixel values "e," "f," "g" and "h"). Other neighbor pixels, such as pixels located on or off diagonals from pixel "x," may also be considered as neighboring pixels.

Two estimates for the pixel value identified by "x" (one estimate using horizontally located neighboring pixel values and the other estimate using vertically located neighboring pixel values) can be mathematically combined to improve the accuracy of the estimate. First and second tables (referred to herein as a "first-level" tables) may be generated using the methods described herein for each of these two estimates. A second-level table combining the predicted values for "x" from the two first level tables may then be generated using the methods described herein to obtain a final estimate. Other methods of combining two estimates for pixels values include using the reliability ratios, averaging two estimates, solving for optimum weights used to combine two or more predictions, and using the prediction with the lowest variance.

Returning to FIG. 2A, in conjunction with FIGS. 1 and 3, in step 202-1, a plurality of candidate pixels are identified for a plurality of identical neighbor pixel groups in the training image. The identical neighbor pixel groups, in this example, include at least two neighboring pixels (e.g., pixels "b" and "c") of the pixel to be estimated (e.g., pixel "x"). As discussed above, when third-order statistics are used to estimate a pixel value, then the two closest neighboring values are used. When fourth-order statistics are used to estimate a pixel value, then the three closest neighboring values are used. When fifth-order statistics are used to estimate a pixel value, then the four closest neighboring values are used. The maximum number of identical neighbor pixel groups is dependent on the number of pixel values that each pixel represents. If each pixel is a grey scale pixel with 256 possible values, then the maximum number of identical neighbor pixel groups including two pixels is $256^2$, the maximum number identical neighbor pixel groups including three pixels is $256^3$, etc.

In step 203-1, a candidate pixel value is determined for each candidate pixel of each of the plurality of identical neighbor pixel groups, thereby obtaining a plurality of candidate pixel values for each of the identical neighbor pixel groups. Identifying the plurality of candidate pixel values at step 203-1 concludes when a candidate pixel value is obtained for each occurrence of each identical neighbor pixel group in the training image that was obtained at step 201-1. Depending on the number of statistical moments to be used, additional values of the squares, cubes and powers of four or higher powers of the candidate pixel values are also determined at step 203-1.

If more training images remain in the training image set, the method 200-1 returns to step 201-1 where another training image is obtained. Steps 201-1 through 201-3 are repeated for each training image in the training image set until a candidate pixel value is obtained for each identical neighbor pixel group in each of the training images in the training image set. When no more training images remain, the method 200-1 continues at step 204-1.

Upon determining all of the candidate pixel values for each of the identical neighbor pixel groups in all of the training images, a plurality of statistical moments are determined at step 204-1 for each of the identical neighbor pixel groups. The plurality of statistical moments can be determined directly using standard statistical formulas (see equations 2A-2I above, for example), or information enabling quick determination of the statistical moments can be determined as an alternative. For example, the plurality of candidate pixels for a given identical neighbor pixel group can be summed and divided by the total number of occurrences of the given identical neighbor pixel group to determine a mean value (a measure of the first statistical moment). In addition, the sums of the squared pixel values, the sums of the cubed pixel values, the sums of the powers of four of the pixel values and number of occurrences can be used to determine the variance (a measure of the first statistical moment, the skewness (a measure of the third statistical moment) and/or the kurtosis (a measure of the fourth statistical moment) using equations 2A-2E, or equations 2F-2I listed above.

Upon determining the plurality of statistical moments at step 204-1, the method 200-1 continues at step 205-1 where an optimum candidate pixel value is obtained for each of the identical neighbor pixel groups based on the determined statistical moments. The optimum candidate pixel value can be determined based on a Bayesian MMSE model, using mean and variance measures, or based on a maximum a posteriori or MAP estimate, using mean, variance, skewness and kurtosis, for example. The mean, variance, skewness and kurtosis parameters could be estimated for a mathematical family of distributions, as specified by the equations 2A-2E, and/or equations 2F-2I listed above. The location of the peak value of the estimated distributions in the family of distributions could then be used as the MAP estimate.

At step 206-1, a table associating indications of the determined statistical moments and/or the determined optimum candidate values with each of the identical neighbor pixel groups is stored in memory (e.g., the RAM 106 or the disk 108). If no further combining of optimum candidate pixel values is needed, the optimum candidate pixel values can be stored in the table at step 206-1. However, if multiple candidate pixel values are to be combined to determine the final optimum candidate pixel value for a plurality of identical neighbor pixel groups, then data indicative of the statistical moments determined at step 204-1 are stored in the table. For example, a mean and a variance of the candidate pixel values of each of the identical neighbor pixel groups can be stored in the table and later combined using, for example, reliability measures "ρ" (1/variance) of two candidate pixel values combined into a relative reliability measure "γ." Other statistical moments (e.g., skewness and/or kurtosis measures) can be used to combine the statistical moments of two or more entries in the table associated with multiple identical neighbor pixel groups. Upon completion of step 206-1, the table stored in memory can be used to interpolate missing pixel values of digital images, even digital images not included in the training image set. In some aspects, the method 200-1 can conclude after completion of step 206-1. However, the exemplary process 200-1 includes steps 207-1 and 208-1 where a digital image is processed using the stored table.

Step 206-1 is the last step in the training portion of the method 200-1. In some aspects, the training portion can use a measure of convergence to determine when enough training images have been considered. For example, the steps 201-1 through 203-1 can be performed multiple times for incrementally larger sets of training images. When the statistical moments that are determined at step 204-1 converge, the training portion can be terminated. Convergence can be determined using a threshold value (e.g., a percentage or an absolute value). If all the statistical moments have converged within the threshold for two consecutive sets of training images, then the training portion is concluded. Percentage thresholds can be on the order of 1%, 2%, 3%, 4%, 5% or larger, depending on the requirements. Absolute thresholds can be an integer number of quantized pixel values, depending on the quantization level. For example an absolute threshold level of 1, 2, 3, 4, 5, 6 or higher could be used for 8-bit pixel values that vary from 0-255.

At step 207-1, the restoration portion of the method 200-1 begins and a digital image is received and a missing pixel is identified. The missing pixel could be the result of transmission errors across a network or image capture errors (e.g., where the image is being captured by a camera, an X-ray machine, etc.). The missing pixel identified at step 207-1 is proximate to a first neighbor pixel group in the received image. The first neighbor pixel group includes pixel values identical to one of the identical neighbor pixel groups identified in step 202-1.

At step 208-1, the processor determines an optimum pixel value for the missing pixel using the stored table. If the stored table includes optimum candidate pixel values, the optimum pixel value can be retrieved directly from the table by identifying the proper identical neighbor pixel group corresponding to the first neighbor pixel group. Alternatively, the statistical moments stored in the table can be used to determine the optimum pixel value at step 208-1. In some systems, candidate pixel values for two pixel groups (e.g., a vertical pixel group and a horizontal pixel group) can be combined using the statistical moments (e.g., mean, variance, skewness and/or kurtosis) that are stored in the table. Steps 207-1 and 208-1 are repeated for each missing pixel in the received image.

In one embodiment, to improve the computation efficiency, a portion of the neighboring pixel values may be quantized. For example, referring to FIG. 3, suppose that 5th-order statistics are used to estimate the pixel value "x." As a result, the pixel values of "a," "b," "c" and "d" may be used to estimate the pixel value "x." In this scenario, the furthest pixel values "a" and "d," also referred to herein as "flanking points," may be quantized as the estimate for obtaining an accurate pixel value depends more on the closer neighboring pixel points "b" and "c" than the further away pixel points "a" and "d.". The amount of quantization for each context pixel can be determined by analysis of various combinations of quantization parameters for different neighboring pixels. Testing has shown that quantization levels or 4, 5, 6, 7, and 8 pixels could be used. For example, if four pixels "a," "b," "c" and "d" were used to estimate pixel "x," then pixels "b" and "c" could be represented by 8 bits and the flanking pixels "a" and "d" could be represented by 4 bits for a total of 24 bits. A total neighbor group represented by 24 bits results in statistical moment tables that include about 16 million entries. Using 6 bits for all four pixels "a," "b," "c" and "d" also gave satisfactory results. Pixel values may also be quantized into data subsets that have unequally spaced bins, or "quantiles." However, some testing has shown that using quantiles did not significantly improve accuracy, which may be due to the fact the distribution of prediction errors is complex and hard to characterize.

By using the method 200-1 for interpolation of missing pixels, the accuracy for estimating a missing pixel value is improved as higher order statistics (e.g., second, third, fourth and fifth) include information that in the prior interpolation algorithms has been ignored due to the restrictive measurements and assumptions. Furthermore, the process for obtaining the Bayesian estimator is simpler and more direct than prior algorithms thereby improving the computation efficiency.

Furthermore, in one aspect, the measured tables described herein could be replaced with smooth functions fitted to the tables to reduce memory requirements. In one aspect, the pixel values of the "a," "b," "c" and "d" pixels, and other neighboring pixel values such as the "e" "f", "g" and "h" pixels, could be mapped into a different feature space found by accuracy maximization analysis (AMA) or other similar procedure. AMA involves finding an optimal encoder for a task of interest, given a relatively small population of noisy "neurons" between the encoder and decoder. The AMA process is described in a paper entitled "Optimal Stimulus Encoders for Natural Tasks" by Wilson s. Geisler, Jiri Najemnik and Almon D. Ing, published on Dec. 16, 2009 in the Journal of Vision, vol. 9 no. 13, article 17.

Method 200-1 may include alternative and/or additional steps that, for clarity, are not depicted. Further, the steps of the method 200-1 may be executed in a different order than the order presented in the discussion of FIG. 2A. Additionally, certain steps in method 200-1 may be executed in a substantially simultaneous manner or may be omitted.

Method 200-1 may be tailored to certain domains, such as medical imaging, satellite imaging, etc. Furthermore, method 200-1 may be used in conjunction with other methods. For example, it may be used in conjunction with JPEG encoding to improve the JPEG encoding. Additionally, method 200-1 may be extended to interpolate between frames in a video sequence. For example, it may be used to create MPEG bi-predictive pictures.

In other aspects, method 200-1 may be used for deblurring of the digital image, removing noise and artifacts from the digital image, as well as encoding the pixel values during image compression.

Figure 2B:
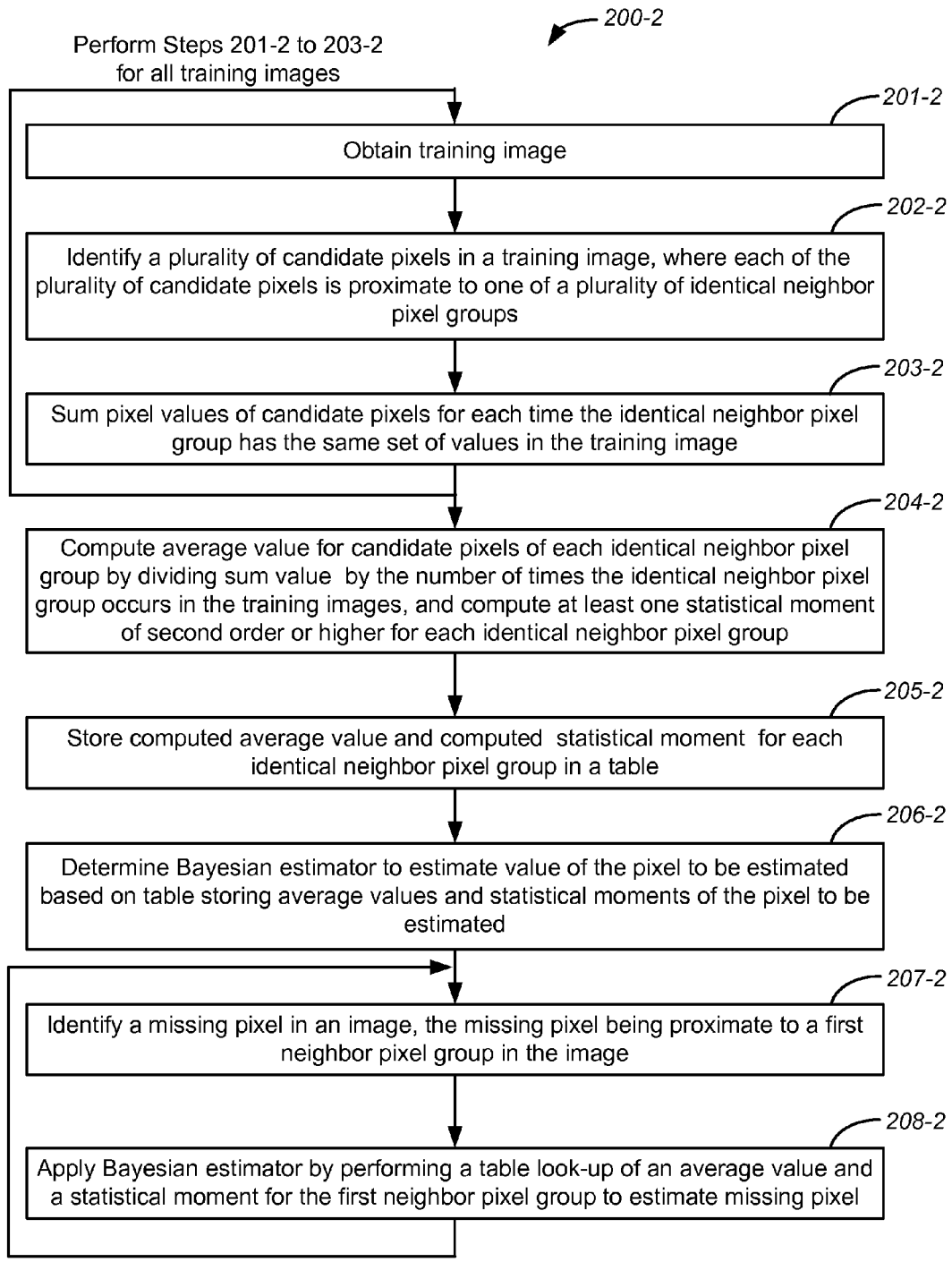
FIG. 2B is a flowchart of another method of missing pixel interpolation in accordance with the disclosure.

FIG. 2B is a flowchart of another method 200-2 of missing pixel interpolation in accordance with the disclosure. The method 200-2 is similar to the method 200-1, but includes certain details. Steps 201-2 and 202-2 are similar to the steps 201-1 and 202-1 in the method 200-1.

In step 203-2, for each of the identical neighbor pixel groups, candidate pixel values are summed together. For example, suppose that pixel values "b," and "c" represent the neighboring pixels in each of the identical neighbor pixel groups and "x" represents the pixel to be interpolated. Suppose further that in one training sample 300, pixel value "x" is 1 when pixel value "b" is 1 and pixel value "c" is 2. Suppose further that in another training sample 300, pixel value "x" is 2 when pixel value "b" is 1 and pixel value "c" is 2. Hence, in this example, pixel value "x" has the values of 1 and 2 when pixel value "b" is 1 and pixel value "c" is 2. As a result, the values of "x" in these two scenarios (1 and 2) are summed to provide a result of 3. By summing instead of storing the values of x for each identical neighbor pixel group comprising the pixel values of "b=1" and "c=2," there is a reduction in the amount of information to be stored which improves the computation efficiency. Depending on the number of statistical moments to be used, additional values and sums of squared values, cubed values and powers of four of the candidate pixel values are also determined at step 203-2.

In step 204-2, the average pixel value of the pixel value to be estimated (e.g., pixel value "x") is computed by dividing the summed value of the pixel value to be estimated (e.g., pixel value "x") which is computed in step 203-2 by the number of times the associated neighboring pixel values (e.g., pixel values "b" and "c") has the same set of values in training samples 300. "Associated," as used herein, refers to those neighboring pixel values that are used in connection for summing the pixel value in step 203. For instance, referring to the example above, the combination of pixel value "b" having the value of 1 and pixel value "c" having the value of 2 occurred twice. Hence, the summed value of 3 is divided by 2 producing a result of 1.5. If variances are to be used in estimating optimal pixel values, the sums of the squares of the candidate pixel values are also used to calculate the variance using equation 2B or 2G. Likewise, if skewness is to be used, the stored sums of the cubes of the pixel values are also used along with equation 2D or 2H. If the kurtosis is to be used, the stored sums of the powers of four of the candidate pixel values are also used along with equation 2E or 2I, and so on.

In step 205-2, the computed average value (or alternatively the summed value) of the pixel value to be estimated (e.g., pixel value "x"), and possibly other parameters including variance, skewness and/or kurtosis, for each independent pixel value group is stored in a table along with the number "N" of occurrences that the identical neighbor pixel group was found in the training images. Furthermore, the associated combination of pixel values for the associate identical neighbor pixel group is also stored in the table. For instance, referring to the example above, an entry of pixel value "x" having the value of 1.5 when pixel value "b" has the value of 1 and pixel value "c" has the value of 2, and the number of occurrences equal to 2 may all be stored in a table. In one embodiment, the table may be stored in disk 108. In another embodiment, the table may be stored in memory. By storing the summed candidate pixel values (the first statistical moment), the summed variances, the summed skewness, and/or the summed kurtosis values, along with the number of occurrences "N" that resulted in the summed values, the second, third and fourth statistical moments (or higher order statistical moments) can be determined using standard statistical relations listed above in equations 2A-2I.

The tables of sums of the means, variances, skewness and/or kurtosis can be temporary tables. Once the tables of sums are obtained from the training set they can be divided by the counts "N" and combined to obtain tables of the means, variances, skewness, kurtosis, etc. In this way, the tables storing the means, variances, skewness and/or kurtosis would be retained once the training images have been processed. In this aspect, the table of the counts ("N" values) would not need to be retained.

In step 206-2, the Bayesian estimator is determined to estimate the value of the pixel to be estimated (e.g., pixel value "x") based on the table storing the average values of the pixel value to be estimated (e.g., pixel value "x") for each unique set of values for the at least two neighboring values (e.g., pixel values "b" and "c"). The Bayesian estimator for estimating the pixel value of "x" may be characterized by the following equation:

$$\sum_x xp(x|b,c) \qquad (3)$$

where x represents the pixel value to be estimated and "b" and "c" represent the neighboring pixel values used to estimate the pixel value "x."

In step 207-2, a digital image with a missing pixel value for pixel "x" is received. Furthermore, the digital image includes the pixel values for the at least two neighboring pixel values (e.g., pixel values "b" and c") which were used to construct the Bayesian estimator for the pixel value "x."

In step 208-2, the Bayesian estimator is applied by performing a table look-up to estimate the value for pixel "x" using the provided values for the at least two neighboring values. For example, if the digital image received in step 207 included the value of 1 for pixel "b" and the value of 2 for pixel "c," then the value of "1.5" for pixel "x" would be obtained from the table look-up.

Method 200-2 may include alternative and/or additional steps that, for clarity, are not depicted. Further, the steps of the method 200-2 may be executed in a different order than the order presented in the discussion of FIG. 2B. Additionally, certain steps in method 200-2 may be executed in a substantially simultaneous manner or may be omitted.

Method 200-2 may be tailored to certain domains, such as medical imaging, satellite imaging. Furthermore, method 200-2 may be used in conjunction with other methods. For example, it may be used in conjunction with JPEG encoding to improve its encoding. Additionally, method 200-2 may be extended to interpolate between frames in a video sequence. For example, it may be used to create MPEG bi-predictive pictures.

In one embodiment, method 200-2 may be used for deblurring of the digital image, removing noise and artifacts from the digital image, as well as encoding the pixel values during image compression.

Furthermore, in one aspect, the measured tables described herein could be replaced with smooth functions fitted to the tables to reduce memory requirements. In one aspect, the pixel values of the "a," "b," "c" and "d" pixels, and other neighboring pixel values such as the "e" "f", "g" and "h" pixels, could be mapped into a different feature space found by accuracy maximization analysis (AMA) or other similar procedure as described above.

The method for improving the accuracy and computation efficiency in upsampling using the principles of the present invention will now be discussed in connection with FIG. 4A.

Figure 4A:
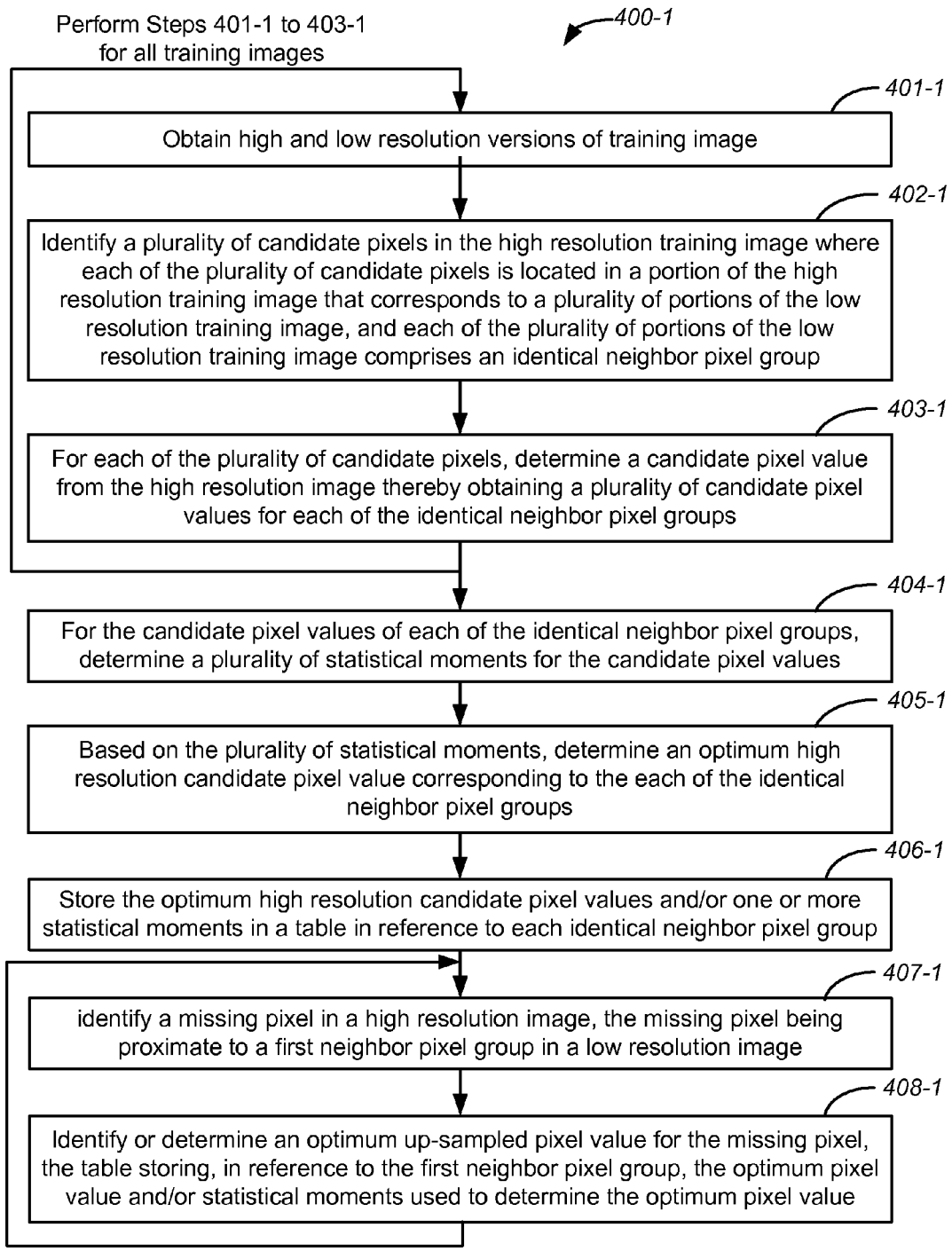
FIG. 4A is a flowchart of a method of upsampling in accordance with the disclosure.

FIG. 4A is a flowchart of a method 400-1 of upsampling. Upsampling refers to the process in improving the resolution of a digital image. In upsampling, image point values in a high resolution image are predicted from those in a low resolution image.

Referring to FIG. 4A, in conjunction with FIG. 1, in step 401-1, two versions of a training image of a set of training images are obtained, the two versions including a low-resolution image and a high resolution ground-truth image. A "ground-truth" image, as used herein, refers to a higher resolution image with more accurate pixel values. An example of a training sample for both the low-resolution image and the ground-truth image is provided in FIG. 5. As stated above, a training sample may refer to a digital array of pixel values extracted from a portion of an array of pixel values on a digital image.

Figure 5:
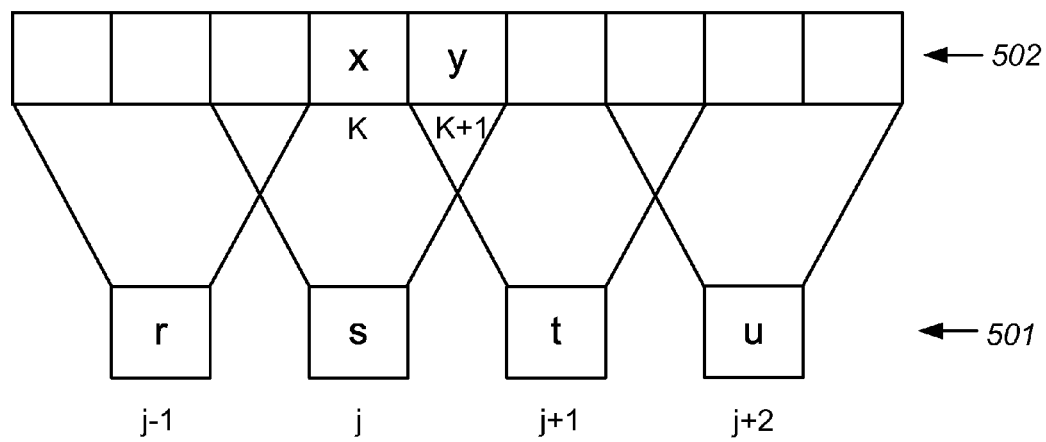
FIG. 5 illustrates a training sample of a high-resolution image and a training sample of a low-resolution image created from the high resolution training sample in accordance with the disclosure.

FIG. 5 illustrates a training sample for a low-resolution image (identified by 501) and a training sample for a high-resolution image (identified by 502). Training sample 501 includes pixel values identified by "r," "s," "t," and "u" in pixel positions identified by "j−1," "j," "j+1" and "j+2," respectively. Training sample 502 includes pixel values identified by "x" and "y" in pixel positions identified by "k" and "k+1," respectively. As further illustrated in FIG. 5, certain locations in the low-resolution image may correspond to locations in the high-resolution image, such as pixel position "j" in the low-resolution image corresponding to pixel position "y" in the high-resolution image. While FIG. 5 illustrates training samples 501, 502 in one dimension for ease of understanding, it is noted that training samples 501, 502 may be in two-dimensional format.

Since upsampling includes the process of interpolation, a Bayesian estimator, in this example, will be constructed for estimating a value in the high-resolution training image based on pixel values in the low-resolution training image. For example, referring to FIG. 5, the pixel value of "x" may be estimated based on pixel values "r," "s," and "t" in the low-resolution image, where pixel "s" is coincident with the pixel value "x" in the high-resolution image and pixel values "r" and "t" are the closest neighboring pixels to pixel "s" in the low-resolution image. In one embodiment, at least three pixel values from the low-resolution image are used to predict a pixel value in the high-resolution image. It is noted that while the following discusses the pixel value identified by "x" as being interpolated, any pixel value in the high-resolution image (e.g., pixel value identified by "y") may be interpolated. Depending on the upsampling ratios between the high and low resolution images, the high resolution pixel "x" may not be coincident with one of the low resolution pixels, as is the case in the example where "x" coincides with "s." For example, an integer upsampling ratio of 2-1, 3-1, or 4-1, etc. will result in some high and low resolution pixels being coincident, but an upsampling ratio of 1.545-1 may not have any or at least not many coincident high and low resolution pixels. In cases where few or no pixels are coincident, all high resolution pixels may be predicted based on four nearest neighbors (or however many nearest neighbors may fit the specific situation).

Returning to FIG. 4A, in conjunction with FIGS. 1 and 5, in step 402-1, a plurality of high resolution candidate pixels "x"

or "y" are identified for a plurality of identical neighbor pixel groups for multiple locations in the low resolution training image obtained at step 401-1. The identical neighbor pixel groups, in this example, include three neighboring pixels "r," "s" and "t" for "x" pixels and four pixels "r," "s," "t" and "u" for "y" pixels. The high resolution candidate pixels "x" and "y" are located in portions of the high resolution training image that correspond to respective portions of the low resolution training image.

In step 403-1, a candidate pixel value is determined for each high resolution candidate pixel associated with each of the plurality of identical neighbor pixel groups in the low resolution image, thereby obtaining a plurality of high resolution candidate pixel values for each of the identical neighbor pixel groups in the low resolution image. Identifying the plurality of candidate pixel values at step 403-1 concludes when a candidate pixel value is obtained for each occurrence of each identical neighbor pixel group in the low resolution training image that was obtained at step 201-1. Depending on the number of statistical moments to be used, additional values of the squares, cubes and powers of four or higher powers of the candidate pixel values are also determined at step 403-1.

If more training images remain in the training image set, the method 400-1 returns to step 401-1 where another high resolution training image and/or another low resolution training image is obtained. A new low resolution training image may be obtained at step 401-1 without the need for a new high resolution image. This is due to the fact that multiple low resolution images may correspond to the same high resolution image. For example, as discussed below in reference to FIG. 6A, four low resolution images may be obtained from a single high resolution image (using digital blurring and downsampling) for a downsampling ratio of 2-1. A downsampling ratio of 3-1 would result in nine possible downsampled images for a single high resolution image. Steps 401-1 through 401-3 are repeated for each high resolution training image and each corresponding low resolution training image in the training image set until a high resolution candidate pixel value is obtained for each identical neighbor pixel group in each of the low resolution training images in the training image set. When no more training images remain, the method 400-1 continues at step 404-1.

Upon determining all of the high resolution candidate pixel values for each of the identical neighbor pixel groups in all of the low resolution training images, a plurality of statistical moments are determined at step 404-1 for each of the identical neighbor pixel groups. The plurality of statistical moments can be determined directly using standard statistical formulas, or information enabling quick determination of the statistical moments can be determined as an alternative. For example, the plurality of candidate pixels for a given identical neighbor pixel group can be summed and divided by the total number of occurrences "N" of the given identical neighbor pixel group to determine a mean value (a measure of the first statistical moment). In addition, the sums of the squared pixel values, the sums of the cubed pixel values, the sums of the powers of four of the pixel values and number of occurrences "N" can be used to determine the variance (a measure of the first statistical moment, the skewness (a measure of the third statistical moment) and/or the kurtosis (a measure of the fourth statistical moment) using equations 2A-2E, or equations 2F-2I listed above.

Upon determining the plurality of statistical moments at step 404-1, the method 400-1 continues at step 405-1 where an optimum candidate pixel value is obtained for each of the identical neighbor pixel groups based on the determined statistical moments. The optimum candidate pixel value can be determined based on a Bayesian MMSE model, using mean and variance measures, or based on a maximum a posteriori or MAP estimate, using mean, variance, skewness and kurtosis, for example. The mean, variance, skewness and kurtosis parameters could be estimated for a mathematical family of distributions, as specified by the equations 2A-2E, and/or equations 2F-2I listed above. The location of the peak value of the estimated distributions in the family of distributions could then be used as the MAP estimate.

At step 406-1, a table associating indications of the determined statistical moments and/or the determined optimum candidate pixel values for each of the identical neighbor pixel groups is stored in memory (e.g., the RAM 106 or the disk 108). If no further combining of optimum candidate pixel values is needed, the optimum candidate pixel values can be stored in the table at step 406-1. However, if multiple candidate pixel values are to be combined to determine the final optimum candidate pixel value for a plurality of identical neighbor pixel groups, then data indicative of the statistical moments determined at step 404-1 are stored in the table. For example, a mean and a variance of the candidate pixel values of each of the identical neighbor pixel groups can be stored in the table and later combined using, for example, reliability measures "$\rho$" (1/variance) of two candidate pixel values combined into a relative reliability measure "$\gamma$." Other statistical moments (e.g., skewness and/or kurtosis measures) can be used to combine the statistical moments of two or more entries in the table associated with multiple identical neighbor pixel groups. Upon completion of step 406-1, the table stored in memory can be used to upsample pixel values of low resolution digital images, even digital images not included in the training image set. In some aspects, the method 400-1 can conclude after completion of step 406-1 and the stored table can be used later by another system to upsample images. However, the exemplary method 400-1 includes steps 207-1 and 208-1 where a digital image is upsampled using the stored table.

Step 406-1 is the last step in the training portion of the method 200-1. As discussed above in reference to the method 200-1, the training portion can use a measure of convergence to determine when enough training images have been considered. For example, the steps 400-1 through 400-3 can be performed multiple times for incrementally larger sets of training images. When the statistical moments that are determined at step 404-1 converge, the training portion can be terminated.

At step 407-1, the upsampling portion of the method 400-1 begins and a low resolution digital image is received and a missing pixel in the to-be-predicted high resolution image is identified. The missing pixel identified at step 407-1 is proximate to a first neighbor pixel group in the received low resolution image. The first neighbor pixel group includes pixel values identical to one of the identical neighbor pixel groups identified in step 402-1.

At step 408-1, the processor determines an optimum pixel value for the missing high resolution pixel using the stored table. If the stored table includes optimum high resolution candidate pixel values, the optimum pixel value can be retrieved directly from the table by identifying the proper identical neighbor pixel group corresponding to the first neighbor pixel group. Alternatively, statistical moments stored in the table can be used to determine the optimum high resolution pixel value at step 208-1. In some systems, high resolution candidate pixel values for two low resolution pixel groups (e.g., a vertical pixel group and a horizontal pixel group) can be combined using the statistical moments (e.g., mean, variance, skewness and/or kurtosis) that are stored in the table. Steps 407-1 and 408-1 are repeated for each missing pixel in the high resolution upsampled image.

Method 400-1 may include alternative and/or additional steps that, for clarity, are not depicted. Further, the steps of the method 400-1 may be executed in a different order than the order presented in the discussion of FIG. 4A. Additionally, certain steps in method 400-1 may be executed in a substantially simultaneous manner or may be omitted.

In one embodiment, to improve the computation efficiency, a portion of the pixel values in the low-resolution image may be quantized as discussed further above.

Figure 4B:
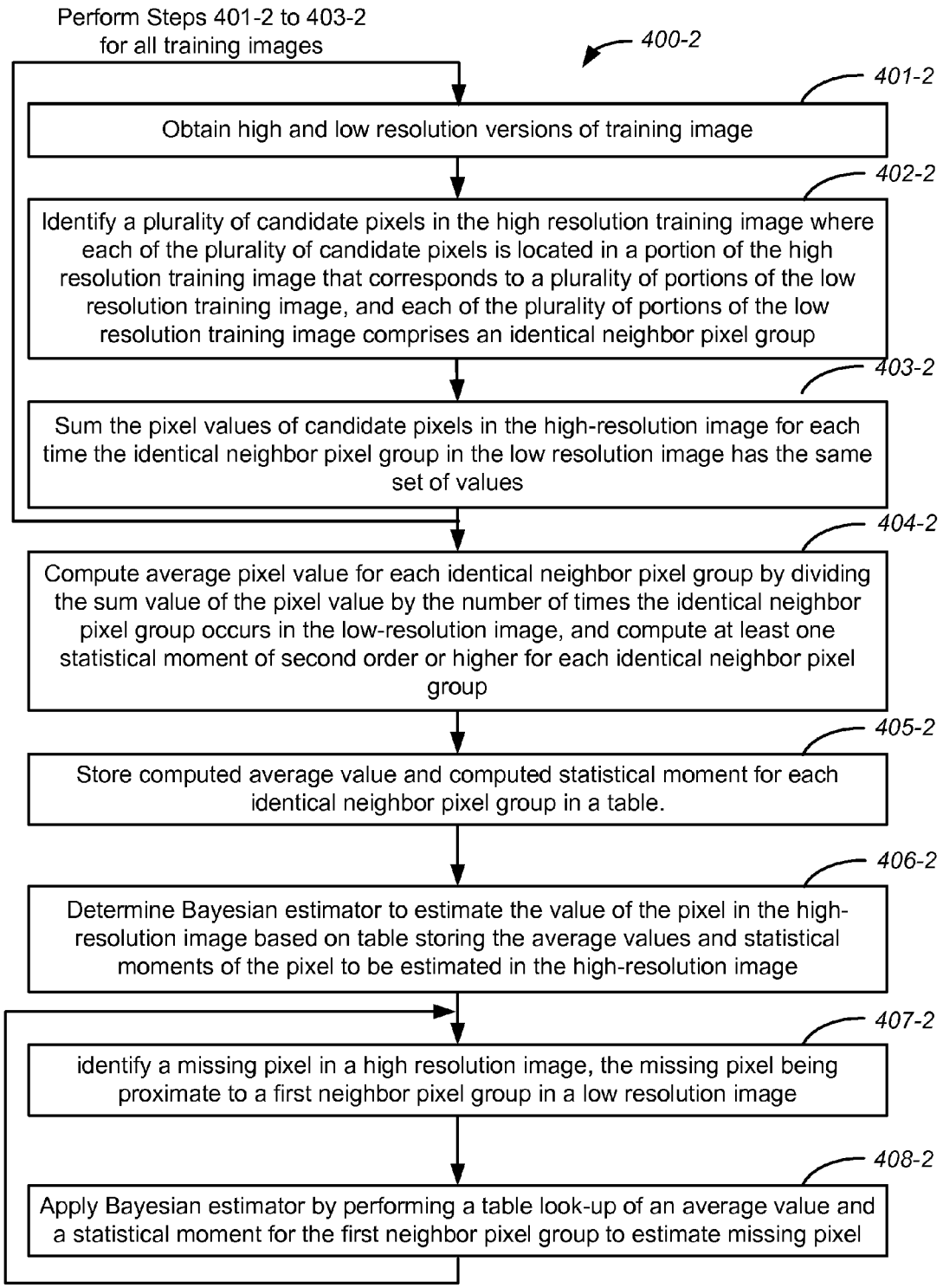
FIG. 4B is a flowchart of another method of upsampling in accordance with the disclosure.

FIG. 4B is a flowchart of another method 400-2 of upsampling. The method 400-2 is similar to the method 400-1, but includes certain details. Steps 401-2 and 402-2 are similar to the steps 401-1 and 402-1 in the method 400-1.

In step 403-2, for each of the identical neighbor pixel groups in the low resolution image, high resolution candidate pixel values of "x" or "y" are summed together. For example, suppose that low resolution pixels "a," "b," and "c" in a particular training sample 501 hav the values 1, 1 and 1, respectively, and high resolution pixel value "x" in a particular training sample 502 has the value of 3. Suppose further that in another training sample 502, pixel value "x" has the value of 2 when pixels "a," "b," and "c" have the values 1, 1 and 1 in another training sample 501. Hence, in this example, pixel value "x" has the values of 3 and 2 when pixel value "a" is 1, pixel value "b" is 1 and pixel value "c" is 1. As a result, the values of "x" in these two scenarios (3 and 2) are summed to provide a result of 5. By summing instead of storing the value of x for each combination of the pixel values of "a," "b" and "c," there is a reduction in the amount of information to be stored which improves the computation efficiency. Depending on the number of statistical moments to be used, additional values of the squares, cubes and powers of four or higher powers of the candidate pixel values are also determined at step 403-2.

In step 404-2, the average pixel value of the high resolution pixel "x" (or "y") to be estimated is computed by dividing the summed value, which is computed in step 403-2, by the number of times the associated identical neighbor pixel group (e.g., pixels "a," "b" and "c" having values of 1, 1 and 1, respectively) occurs the low resolution training images. "Associated," as used herein, refers to those pixel values in the low-resolution image that are used in connection for summing the pixel value in step 403-2. For instance, referring to the example above, the combination of each pixel value "a," "b" and "c" in the low-resolution image having the value of 1 occurred twice. Hence, the summed value of 5 is divided by 2 producing a result of 2.5. In addition, the sums of the squared pixel values, the sums of the cubed pixel values, the sums of the powers of four of the pixel values and number of occurrences can be used to determine the variance (a measure of the first statistical moment, the skewness (a measure of the third statistical moment) and/or the kurtosis (a measure of the fourth statistical moment) using equations 2A-2E, or equations 2F-2I listed above.

In step 405-2, the computed average value (or alternatively the summed value) of the high resolution pixel value to be estimated (e.g., pixel value "x" or "y") for each identical neighbor pixel group is stored in a table along with the number "N" of occurrences that the identical neighbor pixel group was found in the low resolution training images. Furthermore, the associated combination of pixel values for the associate identical neighbor pixel group is also stored in the table. By storing the summed candidate pixel values (the first statistical moment), the summed variances, the summed skewness, and/ or the summed kurtosis values, along with the number of occurrences "N" that resulted in the summed values, the second, third and fourth statistical moments (or higher order statistical moments) can be determined using standard statistical relations listed above in equations 2A-2I.

In step 406-2, the Bayesian estimator is determined to estimate the value of the high resolution pixel to be estimated (e.g., pixel value "x" or "y") based on the table storing the average values of the pixel value to be estimated for each identical neighbor pixel group. The Bayesian estimator for estimating the pixel value of "x" may be characterized by the following equation:

$$\sum_x xp(x\mid a, b, c) \tag{4A}$$

$$\sum_y yp(y\mid a, b, c, d) \tag{4B}$$

where x represents the pixel value to be estimated and "b" and "c" (and "d" in the case of pixel "y") represent the neighboring pixel values used to estimate the pixel value "x" or "y."

In step 407-2, a low resolution digital image to be upsampled is received. Furthermore, the digital image includes the pixel values for the at least three or four neighboring pixel values which were used to construct the Bayesian estimator for the pixel value "x" or "y."

In step 408-2, the Bayesian estimator is applied by performing a table look-up to estimate the value for pixel "x" or "y" using the provided values for the at least two neighboring values. For example, if the digital image received in step 207 included the value of 1 for pixel "b" and the value of 2 for pixel "c," then the value of "1.5" for pixel "x" would be obtained from the table look-up.

Method 400-2 may include alternative and/or additional steps that, for clarity, are not depicted. Further, the steps of the method 400-2 may be executed in a different order than the order presented in the discussion of FIG. 4B. Additionally, certain steps in method 400-2 may be executed in a substantially simultaneous manner or may be omitted.

In one embodiment, to improve the computation efficiency, a portion of the pixel values in the low-resolution image may be quantized as discussed further above. Furthermore, in one aspect, the measured tables described herein could be replaced with smooth functions fitted to the tables to reduce memory requirements. In one aspect, the pixel values of the low resolution pixels could be mapped into a different feature space found by accuracy maximization analysis (AMA) or other similar procedure as described above.

Figure 4C:
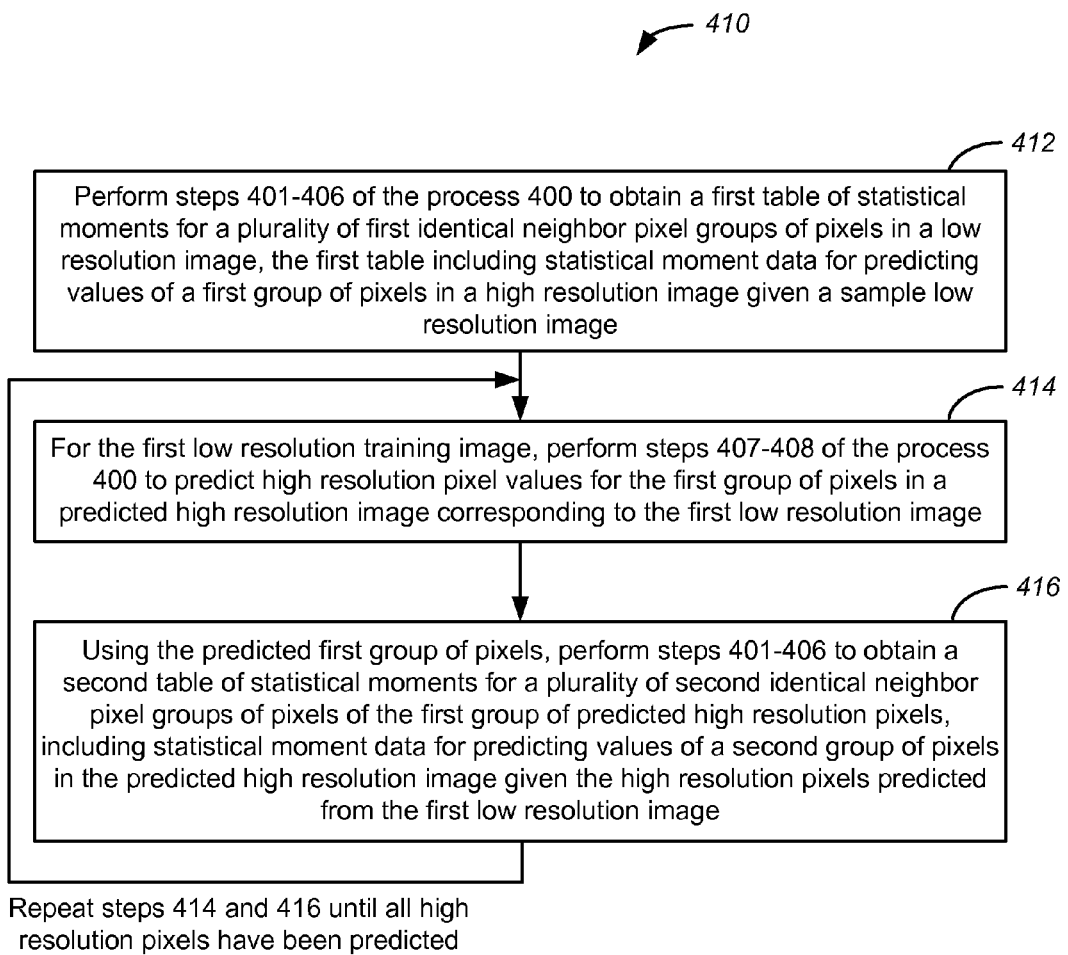
FIG. 4C is a flowchart of a method of determining statistical moment tables for use in the upsampling methods of FIGS. 4A and 4B.
Figure 6A:
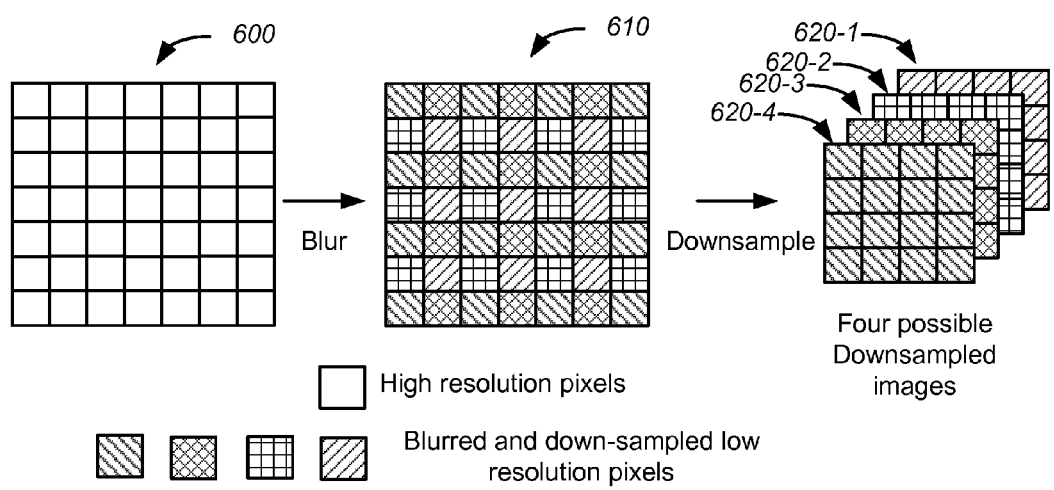
FIG. 6A is a graphic illustration of generating low resolution training images from high resolution training images.
Figure 6B:
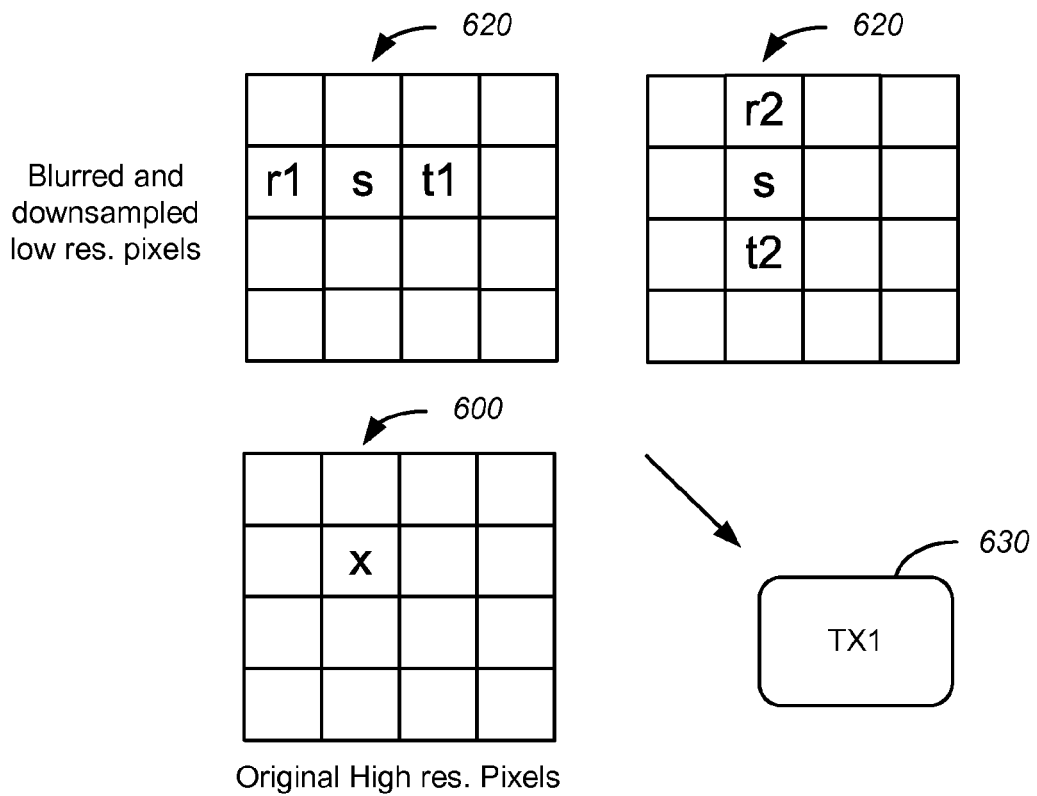
FIGS. 6B, 6C, 6D and 6E are graphic illustrations of steps for generating statistical moment tables for upsampling from a low resolution image to generate a high resolution image.
Figure 6C:
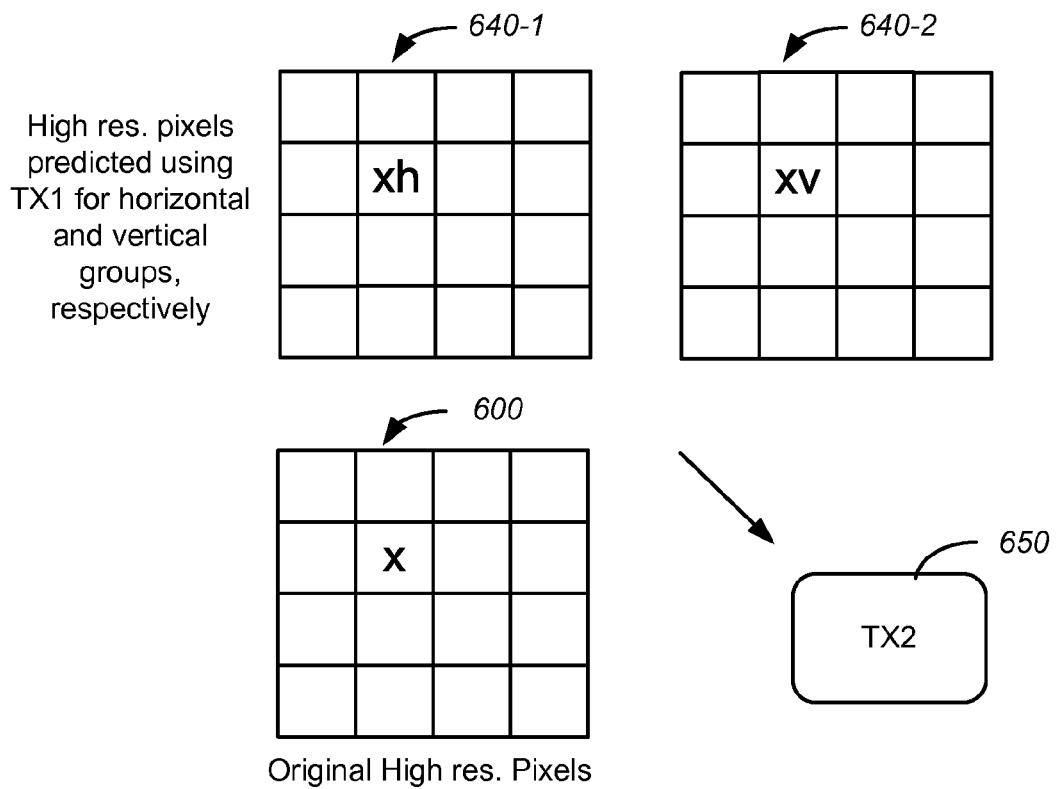
Figure 6D:
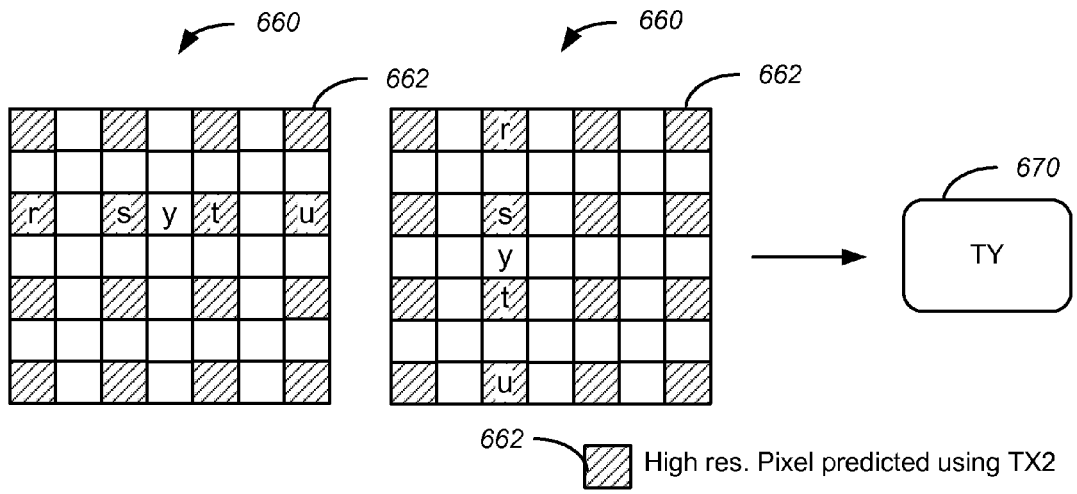

FIG. 4C is a flowchart of another method 410 of determining statistical moment tables in the training portion of the upsampling methods 400-1 and 400-2 of FIGS. 4A and 4B. The method 410 uses multiple training portions of the methods 400 in developing multiple statistical moment tables that will be used sequentially to upsample the low resolution images to predict specific pixels in the high resolution image. FIG. 6A shows how four low resolution images can be derived from a single high resolution image using 2-1 downsampling at steps 401 in the methods 400-1 and 400-2. A high resolution image 600 is blurred to arrive at a blurred image 610. Blurring can comprise using a low pass filter that results in throwing away the high frequency components of the high resolution image 600. The low pass filter can be a blur kernel, e.g., a Gaussian blur function that is performed in the spatial domain. After the blurred high resolution image 610 is formed, four different downsampled low resolution images 620-1, 620-2, 620-3 and 620-4 are formed. These four downsampled images are all used in conjunction with the same high resolution image 600 in the training portion of the processes 400. Alternatively, blurring can also be accomplished by averaging square groups of pixels (e.g., two by two groups, three by three groups, etc.) to form averaged pixel values.

Returning to FIG. 4C, in conjunction with FIGS. 1 and 6A-6F, step 412 comprises performing the steps 401-406 of one of the processes 400 to obtain a first table of statistical moments for a plurality of first identical neighbor pixel groups of pixels in a low resolution image, the first table including statistical moment data for predicting values of a first group of pixels in the high resolution image given a sample low resolution image. In the example images of FIG. 6B, the identical neighbor pixel groups in the low resolution image 620 include a pixel "s" that is coincident with pixel "x" (the pixel to be predicted I the high resolution image 600), a pair of pixels "r1" and "t1" positioned horizontal and adjacent to "s," and pixels "r2" and "t2" positioned vertical and adjacent to pixel "s." In this example, the horizontal pixel groups (r1, s, t1) and the vertical pixel groups (r2, s, and t2) are considered to be equivalent in determining the expected value of "x," the pixel to be predicted in the high resolution image. In other words, the statistical moment ($k^{th}$ moment) of "x" depends on three conditional variables (r, s, t) and is represented in the following equation:

$$E(x^k \mid r, s, t) = \sum_x x^k p(x \mid r, s, t) \tag{5}$$

A first statistical moment table, TX1 630, includes statistical moment data including the summed values of the high resolution pixels "x," and one or more of the summed values of the squares, cubes and/or powers of four of the pixel values, and the number of occurrences of both the vertical groups (r1, s, t1) and the horizontal groups (r2, s, t2). When r1=r2 and t1=t2, the respective candidate pixel value x, and one or more of the summed squares, cubes and/or powers of four of the pixel value, is summed and stored in association with the same identical neighboring pixel group in the table TX1 630. After the first Table TX1 630 is completely populated (after the first low resolution image has been completely processed as discussed in reference to steps 401-406 in the methods 400-1 and 400-2), the process 410 continues to step 414. Step 412 can be repeated for multiple high and low resolution training images 600 and 620 (e.g., all the high and low resolution images 600 and 620 in the training image set) before the process continues on to step 414 in order to improve the robustness of the table TX1 630, but this is a simplified example using only one low resolution image 620.

At step 414, steps 407 and 408 of one of the processes 400 are performed to predict high resolution pixels "xh" and "xv" in intermediate high resolution images 640-1 and 640-2 (See FIG. 6C) based on the horizontal pixel groups (r1, s, t1) and the vertical pixel groups (r2, 2, t2), respectively. After the intermediate high resolution images 640-1 and 640-2 have been fully populated, the method 410 continues to step 416. Step 414 can be repeated for multiple low resolution training images 620 (e.g., all the low resolution images 620 in the training image set) before the process continues on to step 416 in order to improve the robustness of the table TX2 650, but this is a simplified example using only one low resolution image 620.

At step 416, the predicted high resolution pixels "xh" and "xv" are considered a second identical neighbor pixel group for each high resolution pixel "x" in the high resolution image 600 and step 416 comprises performing steps 401-406 in one of the methods 400 to obtain a second table of optimum high resolution candidate pixel values TX2 650 for the second identical neighbor pixel groups of pixels (xh, xv). Statistical moment data for the for the "x" candidate pixel values for each of the (xh, xv) independent neighbor pixel groups is stored in table TX2 630.

Upon generating the TX2 table 650, the process 410 repeats step 414. At step 414, the table TX2 650 is used for predicting values of a second group of pixels, pixels 662 in FIG. 6D, in the predicted high resolution image 660 given the high resolution pixels "xh" and "xv" in the intermediate high resolution images 640-1 and 640-2 that were predicted from the low resolution image 620. In this instance, the second group of pixels 662 is the same group of pixels as the first group of pixels. By considering both vertical and horizontal neighbor pixel groups (r1, s, t1) and (r2, s, t2), each predicted pixel 662 depends on five low resolution pixels, thereby improving the accuracy of the high resolution pixel predictions obtained using the first and second tables TX1 630 and TX2 650.

Upon generating the pixels 662 using the table TX2 650, the method 410 repeats step 416 to generate a table TY 670 that will be used to predict "y" pixels based on identical neighbor pixel groups that comprise four predicted pixels 662. The four predicted pixels 662 are shown as "r," "s", "t," and "u" in FIG. 6D. The table TY 670 will include statistical moment data for predicting pixels 664 shown in FIG. 6E. Each pixel 664 is predicted based on either vertical or horizontal identical neighbor pixel groups of (r, s, t, u).

Upon generating the TY table 670, the process 410 repeats step 414. At step 414, the table TY 670 is used for predicting values of a third group of pixels, pixels 664 in FIG. 6E, in the predicted high resolution image 660 given the high resolution pixels 662 that were predicted from the "xh" and "xv" pixels using table TX2 650. The third group of pixels 664 are then used to predict a table TZ 680 at step 416.

Figure 6E:
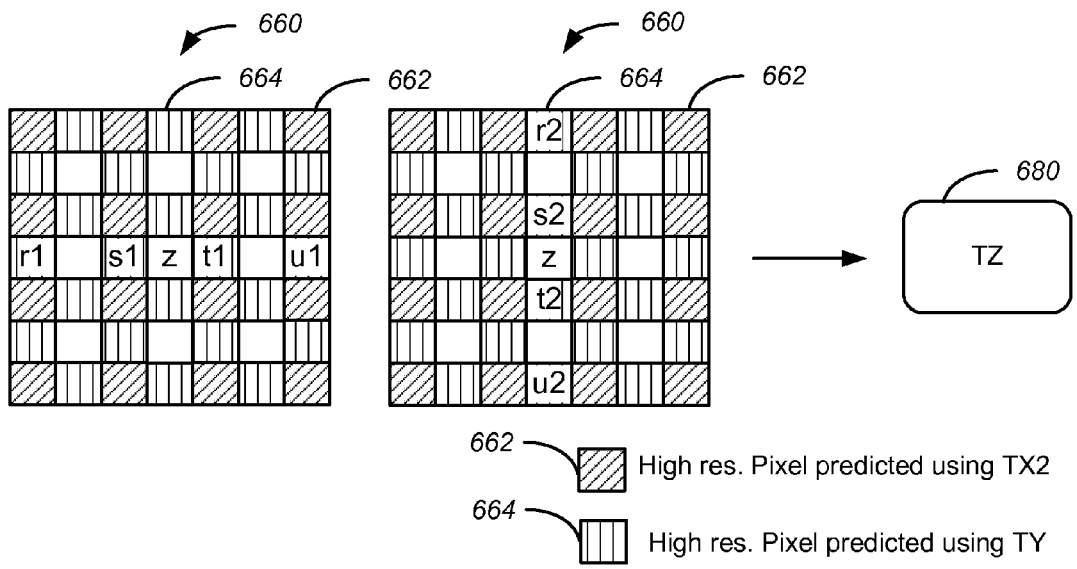
Figure 6F:
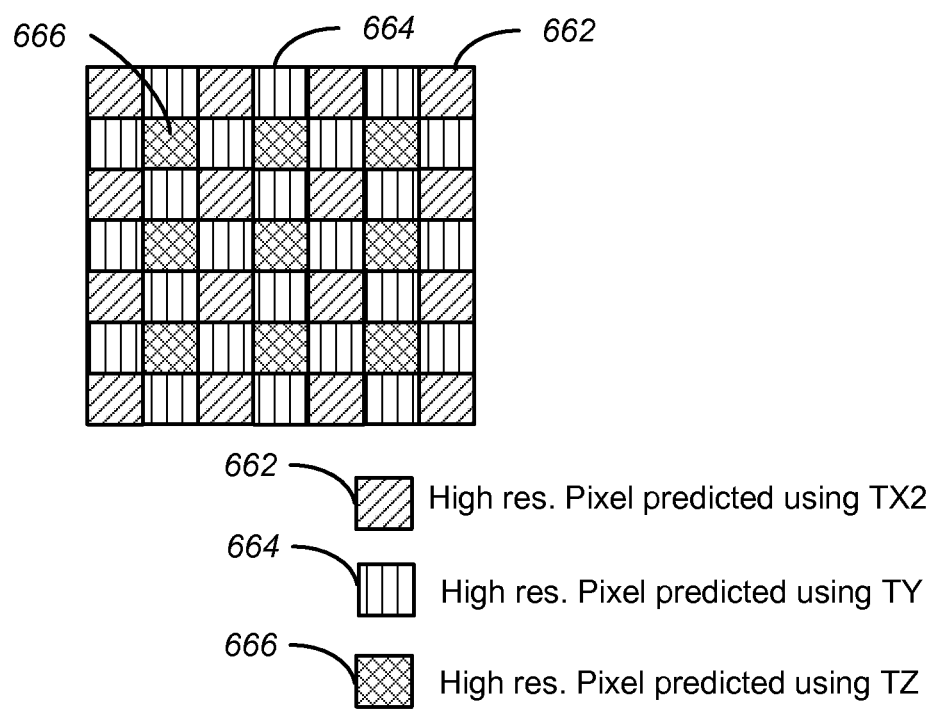
FIG. 6F illustrates a high resolution image generated from a low resolution image using the statistical moment tables illustrated in FIGS. 6B-6E.

Upon generating the pixels 664 using the table TY 670, the method 410 repeats step 416 to generate the table TZ 680 that will be used to predict the final set of pixels 666 in FIG. 6F, where pixels 666 are non-coincident pixels similar to the "y" pixels shown in the training sample 502 in FIG. 5, based on identical neighbor pixel groups that comprise two sets of four predicted pixels 664, a horizontal set including "r1," "s1," "t1" and "u1," and a vertical set including "r2," "s2," "t2" and "u2," as shown in FIG. 6E. The table TZ 680 will include statistical moment data including mean values and one or more of variance, skewness and kurtosis values for predicting pixels 666 shown in FIG. 6F. Each pixel 666 is predicted based on both a vertical and horizontal identical neighbor pixel group of (r, s, t, u) combined using reliability measures "ρ" (1/variance) of two "z" candidate pixel values combined into a relative reliability measure "γ." After all the pixels 666 are predicted, the final high resolution image 660, as shown in FIG. 6F, has been fully predicted from the low resolution image.

The method 410 was described using only a single high and low resolution image. However, as discussed above, the table generation steps 412 and 416, and the prediction step 414 can each be repeated multiple times for the entire training image set of high resolution images and low resolution images. The method 410, as described above using the pixel groups as depicted in FIGS. 6A-6F, results in each high resolution pixel 662 being predicted from 5 low resolution pixels using tables TX1 630 and TX2 650, results in each high resolution pixel 664 being predicted from 14 low resolution tables using the table TY 670, and results in each high resolution pixel 666 being predicted from 32 low resolution pixels. Dependence on such high numbers of low resolution pixels provides for unprecedented robustness and accuracy in upsampling a low resolution image.

Method 410 may include alternative and/or additional steps that, for clarity, are not depicted. Further, the steps of the method 410 may be executed in a different order than the order presented in the discussion of FIG. 4C. Additionally, certain steps in method 410 may be executed in a substantially simultaneous manner or may be omitted.

Furthermore, in one aspect, the measured tables described herein could be replaced with smooth functions fitted to the tables to reduce memory requirements. In one aspect, the pixel values of the low resolution pixels could be mapped into a different feature space found by accuracy maximization analysis (AMA) or other similar procedure as described above.

Figure 7:
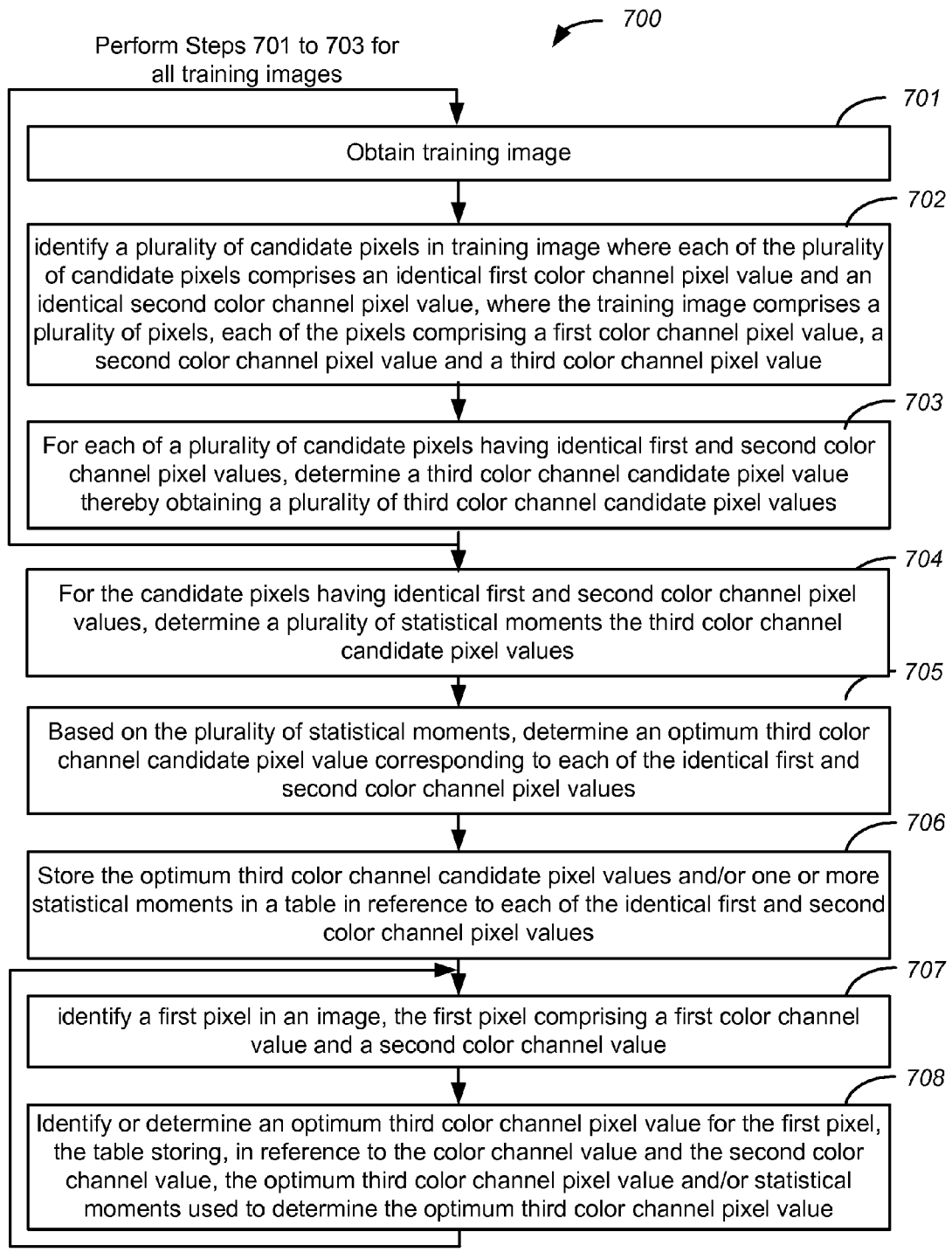
FIG. 7 is a flowchart of a method of predicting a missing/additional color channel in accordance with the disclosure.

FIG. 7 is a flowchart of a method 700 of predicting a missing or additional color channel in accordance with the disclosure. As with the methods 200 and 400 discussed above, the method 700 includes a training portion including steps 701 to 706, and a restoration portion including steps 707 and 708. The training portion uses a set of training images to derive a statistical moment table that is then used in the restoration portion to predict pixel values for an additional or missing color channel for an image. Method 700 can be used for better lossless image compression, or for converting from 3-channel to 4-channel color images or video (e.g., convert an RGB video signal to RYGB for display on a four channel television.).

Referring to FIG. 7, in conjunction with FIG. 1, in step 701, a training image is obtained. The training image is one of a plurality of training images in a set of training images. The training image set can be an arbitrarily large set, such as on the order of hundreds or thousands of images.

Upon obtaining the training image, the method 700 continues at step 702 where a plurality of candidate pixels are identified in the training image. Each of the plurality of candidate pixels includes an identical first color channel pixel value and an identical second color channel pixel value. The training image comprises a plurality of pixels and each pixel is characterized by a first color channel pixel value (e.g., a red pixel value), a second color channel pixel value (e.g., a blue pixel value) and a third color channel pixel value (e.g., a green pixel value). If a fourth color channel is being predicted from training images with three color channels, then the candidate pixels will include identical first, second and third color channel pixel values.

In step 703, a third color channel candidate pixel value is determined for each of the candidate pixels having identical first and second color channel pixel values, thereby obtaining a plurality of third color channel candidate pixel values. Identifying the plurality of third color channel candidate pixel values at step 703 concludes when a third color channel candidate pixel value is obtained for each occurrence of each unique pixel having identical first and second color channel pixel values in the training image that was obtained at step 701.

If more training images remain in the training image set, the method 700 returns to step 701 where another training image is obtained. Steps 701 through 703 are repeated for each training image in the training image set until a third color channel candidate pixel value is obtained for each unique pixel having identical first and second color channel pixel values in the training image set. When no more training images remain, the method 700 continues at step 704.

Upon determining all of the third color channel candidate pixel values for each candidate pixel having identical first and second color channel pixel values in all of the training images, a plurality of statistical moments are determined at step 704 for each of the candidate pixels having identical first and second color channel pixel values. The plurality of statistical moments can be determined directly using standard statistical formulas such as equations 2A-2I, or information enabling quick determination of the statistical moments can be determined as an alternative. For example, the plurality of candidate pixels having a given combination of identical first and second color channel pixel values can be summed and divided by the total number of occurrences to determine a mean value (a measure of the first statistical moment). Similarly, sums of the squares, cubes and powers of four of pixel values can be determined and used to calculate variance, skewness, and/or the kurtosis values using standard statistical relations listed above in equations 2A-2I.

Upon determining the plurality of statistical moments at step 704, the method 700 continues at step 705 where an optimum third color channel candidate pixel value is obtained corresponding to each of the identical first and second color channel pixel values based on the determined statistical moments. The optimum third color channel candidate pixel value can be determined based on a Bayesian MMSE model, using mean and variance measures, or based on a maximum a posteriori or MAP estimate, using mean, variance, skewness and kurtosis, for example. The mean, variance, skewness and kurtosis parameters could be estimated for a mathematical family of distributions, as specified by the equations 2A-2E, and/or equations 2F-2I listed above. The location of the peak value of the estimated distributions in the family of distributions could then be used as the MAP estimate.

At step 706, a table associating indications of the determined statistical moments and/or the determined third color channel optimum candidate values with each of the identical first and second color channel pixel values is stored in memory (e.g., the RAM 106 or the disk 108). If no further combining of optimum third color channel candidate pixel values is needed, the optimum third color channel candidate pixel values can be stored in the table at step 206-1. However, if multiple third color channel candidate pixel values are to be combined to determine the final optimum third color channel candidate pixel value for a plurality of pixels with identical first and second color channel pixel values, then data indicative of the statistical moments determined at step 704 are stored in the table. This situation could occur if first and second color channel values of one or more neighboring pixels were also considered for each candidate pixel. Upon completion of step 706, the table stored in memory can be used to interpolate third color channel pixel values of digital images, even digital images not included in the training image set. In some aspects, the method 700 can conclude after completion of step 706. However, the exemplary process 700 includes steps 707 and 708 where a digital image is processed using the stored table.

At step 707, the restoration portion of the method 700 begins and a digital image is received and a candidate pixel lacking a color channel pixel value is identified. The missing color channel pixel value could be the result of transmission errors across a network or image capture errors (e.g., where the image is being captured by a camera, an X-ray machine, etc.). The missing third color channel value could also be omitted purposely as part of an image compression system. The candidate pixel identified at step 707 includes color channel pixel values for the first and second color channels. The first and second color channel pixel values are identical to one of the combinations of identical first and second color channel pixel values identified in step 702.

At step 708, the processor determines an optimum third color channel pixel value for the candidate pixel using the stored table. If the stored table includes optimum third color channel candidate pixel values, the optimum third color channel pixel value can be retrieved directly from the table by identifying the proper identical first and second color channel pixel values corresponding to the candidate pixel. Alternatively, the statistical moments stored in the table can be used to determine the optimum third color channel pixel value at step 708. Steps 707 and 708 are repeated for each missing pixel in the received image.

Method 700 may include alternative and/or additional steps that, for clarity, are not depicted. Further, the steps of the method 700 may be executed in a different order than the order presented in the discussion of FIG. 7. Additionally, certain steps in method 700 may be executed in a substantially simultaneous manner or may be omitted.

Furthermore, in one aspect, the measured tables described herein could be replaced with smooth functions fitted to the tables to reduce memory requirements. In one aspect, the pixel values of the candidate pixels lacking a color channel could be mapped into a different feature space found by accuracy maximization analysis (AMA) or other similar procedure as described above.

The methods, systems and devices discussed above are examples. Various aspects may omit, substitute, or add various procedures or components as appropriate. For instance, testing has shown that statistical moment tables that contain about 16 million entries provided good results and using more or fewer entries could result in less accurate predictions, however, the prediction accuracy may only suffer moderately when using a smaller database, for example one containing one-tenth the number of images. Further, rather than using a statistical moment table containing all possible context values of neighbor groups, systems using a "hash table" that allows storing only specific neighbor groups with specific context values, while ignoring others could be used. The advantage of a hash table being that the table may contain larger, frequently encountered contexts without wasting memory on shorter, less frequently encountered contexts. Some systems can normalize the conditional distributions of pixel values by dividing each distribution by its variance. This normalization gives all tables the same shape and allows for the possibility of combining tables and storing only their mean values. In some image processing systems, distributions are often smoothed, thereby removing noise and possibly improving performance. However, testing of natural images showed that smoothing the statistical moment tables did not improve performance. However, systems dealing with other types of images may show improved performance using smoothed tables.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

What is claimed is:

1. A method, comprising:
a computing system receiving a first training image;
the computing system determining a plurality of pixel neighborhoods in a second training image that is a lower-resolution version of the first training image, wherein the plurality of determined pixel neighborhoods have a number of distinct pixel arrangements in the second training image, and wherein at least two of the plurality of pixel neighborhoods have identical pixel arrangements in the second training image;
the computing system determining, for each of the distinct pixel arrangements in the second training image, a corresponding pixel value in the first training image; and
for each of the identical pixel arrangements in the second training image having a plurality of corresponding pixel values in the first training image, the computing system calculating a single corresponding pixel value based on the plurality of corresponding pixel values in the first training image.

2. The method of claim 1, wherein the computing system receives a plurality of first training images, and wherein the plurality of pixel neighborhoods are in a plurality of second training images that are lower-resolution versions of the plurality of first training images.

3. The method of claim 1, further comprising:
the computing system creating the second training image from the first training image.

4. The method of claim 3, further comprising:
the computing system creating a plurality of second training images from the first training image.

5. The method of claim 1, further comprising:
the computing system storing the calculated single corresponding pixel values in a table.

6. The method of claim 1, further comprising:
the computing system receiving a non-training image; and
the computing system determining a higher-resolution version of the non-training image based on the calculated single corresponding pixel values.

7. The method of claim 1, wherein the calculated single corresponding pixel value is based on at least one statistical moment for the plurality of corresponding pixel values.

8. The method of claim 7, wherein the at least one statistical moment includes a mean.

9. A system, comprising:
at least one processor; and
a memory having instructions coded thereon that, in response to execution by the at least one processor, cause the system to perform operations comprising:
receiving at least one first training image;
determining a plurality of pixel neighborhoods in at least one second training image that is a lower-resolution version of the at least one first training image, wherein the plurality of determined pixel neighborhoods have a number of distinct pixel arrangements in the at least one second training image, and wherein at least two of the plurality of pixel neighborhoods have identical pixel arrangements in the at least one second training image;
determining, for each of the distinct pixel arrangements in the at least one second training image, a corresponding pixel value in the at least one first training image; and
for each of the identical pixel arrangements in the at least one second training image having a plurality of corresponding pixel values in the at least one first training image, calculating a single corresponding pixel value based on the plurality of corresponding pixel values in the at least one first training image.

10. The system of claim 9, wherein the at least one first training image includes a plurality of first training images, and wherein the at least one second training image includes a plurality of lower-resolution versions of the plurality of first training images.

11. The system of claim 10, wherein the operations further comprise:
receiving the plurality of first training images in succession; and
performing the operation of calculating the single corresponding pixel value at least once for each of the plurality of first training images.

12. The system of claim 11, wherein the operations further comprise:
determining a total number of the plurality of first training images based on a change in the calculated single corresponding pixel value being below a threshold amount for a consecutive two of the plurality of first training images.

13. The system of claim 9, wherein the operations further comprise:
storing the calculated single corresponding pixel value in a table.

14. The system of claim 13, wherein the operations further comprise:
associating the single corresponding pixel value in the table with the corresponding distinct pixel arrangement.

15. An article of manufacture including at least one non-transitory, computer-readable medium having instructions stored thereon that, in response to execution by a computing system, cause the computing system to carry out operations comprising:
receiving a first training image;
determining a plurality of pixel neighborhoods in a second training image that is a lower-resolution version of the first training image, wherein the plurality of determined pixel neighborhoods have a number of distinct pixel arrangements in the second training image, and wherein at least two of the plurality of pixel neighborhoods have identical pixel arrangements in the second training image;
determining, for each of the distinct pixel arrangements in the second training image, a corresponding pixel value in the first training image; and
for each of the identical pixel arrangements in the second training image having a plurality of corresponding pixel values in the first training image, calculating a single corresponding pixel value based on the plurality of corresponding pixel values in the first training image.

16. The article of claim 15, wherein the operations further comprise storing data indicative of the calculated single corresponding pixel value in a table.

17. The article of claim 15, wherein the first training image is a grey scale image.

18. The article of claim 17, wherein the second training image is a grey scale image.

19. The article of claim 15, wherein the operations further comprise:
determining the second training image based on the first training image via at least one blurring operation.

20. The article of claim 15, wherein the operations further comprise:
determining the second training image based on the first training image via at least one down-sampling operation.

21. The article of claim 15, wherein the operations further comprise:
determining the second training image based on the first training image via at least one blurring operation and at least one down-sampling operation.

22. The article of claim 15, wherein the operations further comprise:
determining a plurality of possible second training images based on the first training image.

* * * * *